(12) United States Patent
Hummel

(10) Patent No.: US 6,333,918 B1
(45) Date of Patent: Dec. 25, 2001

(54) METHOD OF FORMING ROUTING DATA

(75) Inventor: Heinrich Hummel, Guending (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/091,636

(22) PCT Filed: Dec. 4, 1996

(86) PCT No.: PCT/EP96/05423

§ 371 Date: Apr. 8, 1999

§ 102(e) Date: Apr. 8, 1999

(87) PCT Pub. No.: WO97/23978

PCT Pub. Date: Jul. 3, 1997

(30) Foreign Application Priority Data

Dec. 21, 1995 (EP) .............................................. 95 120 259

(51) Int. Cl.[7] .............................. H04L 12/24; H04L 12/66
(52) U.S. Cl. ......................... 370/238; 370/255; 370/400; 709/238
(58) Field of Search .................................... 370/217, 218, 370/225, 228, 229, 235, 238, 254, 255, 256, 389, 395, 396, 397, 400, 401; 709/238, 239, 240, 241, 242, 243

(56) References Cited

U.S. PATENT DOCUMENTS

| 5,144,619 |   | 9/1992  | Munter ................................ 370/60.1 |
| 5,265,092 | * | 11/1993 | Soloway et al. ....................... 370/60 |
| 5,408,469 |   | 4/1995  | Opher ................................. 370/60.1 |
| 5,488,608 | * | 1/1996  | Flammer, III ..................... 370/85.13 |
| 5,491,690 | * | 2/1996  | Alfonsi et al. ......................... 370/60 |
| 5,495,479 | * | 2/1996  | Galaand et al. ....................... 370/60 |
| 5,541,915 |   | 7/1996  | Storm ................................. 370/60.1 |
| 5,629,930 |   | 5/1997  | Beshai et al. ....................... 370/39.6 |
| 5,781,529 | * | 7/1998  | Liang et al. .......................... 370/218 |
| 5,781,537 | * | 7/1998  | Ramaswami et al. ............... 370/254 |
| 5,831,982 | * | 11/1998 | Hummel ............................. 370/396 |

OTHER PUBLICATIONS

Computer Networks and ISDN Systems, vol. 12, No. 1, (1986) Amsterdam, Netherlands, A.E. Baratz et al, Establishing Virtual Circuits in Large Computer Networks, pp. 27–37.

Computer Communication Review, vol. 25, No. 2, Apr. 1995, W.C. Lee, Topology Aggregation for Hierarchical Routing in ATM Networks, pp. 82–92.

IEEE Journal on Selected Areas in Communications, vol. 7, No. 8, Oct. 1989, New York, V.R. Saksena, Topological Analysis of Packet Networks, pp. 1243–1252.

Proceedings of Infocom '95, Conference on Computer Communications, 14th Annual Joint Conference of the IEEE Computer & Communications Societies, Boston, vol. 3, Apr. 1995, G.M. Huang et al, A New HAD Algorithm for Optimal routing of Hierarchically Structured Data Networks, pp. 594–601.

ATM Forum 94–0471R14, Appendix H: Route Generation Algorithm, A Sample Algorithm for Route Generation, pp. 314–321.

* cited by examiner

Primary Examiner—Alpus H. Hsu
(74) Attorney, Agent, or Firm—Schiff Hardin & Waite

(57) ABSTRACT

Switching nodes of a communications network are assigned subnetworks and are interconnected to one another in any desired fashion. Stored in a source switching node is at least topology information on the node's own subnetwork and on the interconnection of the subnetworks. In addition, the source switching node is provided with the communications conditions which are required for the communications link to be set up. By reference to the topology information, a subset of switching nodes and connecting lines which satisfies the communications conditions is selected and a route to the destination switching node is determined. Included in this process is a route which, in the direction from the source switching node to the destination switching node, leaves at least one subnetwork once and returns to the subnetwork again in the further course of the route. The routing information is then formed from the route which has been determined.

10 Claims, 11 Drawing Sheets

Link#: from-node#-to-node#
1:1-2; 2:2-1; 3:1-3; 4:4-3;
5:1-4; 6:4-1; 7:1-5; 8:5-1;
9:1-6; 10:6-1; 11:2-6; 12:6-2;
13:2-8; 14:8-2; 15:3-9; 16:9-3;
17:4-10; 18:10-4; 19:5-14; 20:14-5;
21:6-15; 22:15-6;
13;7-8; 24:8-7; 25:7-9; 26:9-7;
27:7-10; 28:10-7; 29:7-11; 30:11-7;
31:10-11; 32:11-10; 33:11-13; 34:13-11;
35:12-13; 36:13-12; 37:12-14; 38:14-12;
39:12-15; 40:15-12;

41:16-6; 42:6-16; 43:16-20; 44:20-16;
45:16-19; 46:19-16; 47:16-17; 48:17-16;
49:17-18; 50:18-17; 51:18-19; 52:19-18;
53:19-20; 54:20-19; 55:19-21; 56:21-19;
57:21-5; 58:5-21; 59:21-22; 60:22-21;
61:21-23; 62:23-21; 63:21-23; 64:23-22;
65:22-24; 66:24-22; 67:24-11; 68:11-24;

METHOD OF FORMING ROUTING DATA

BACKGROUND OF THE INVENTION

When links are routed in communications networks such as narrowband or ATM networks (ATM=Asynchronous Transfer Mode), for example, there are basically two alternative approaches, namely the "hop-by-hop routing method", in which each transit node itself decides how to the forward the connection set-up request, and source routing in which the source node S (to which the subscriber initiating the connection request is connected) adds a route description to the connection set-up message, which description has to be followed by the transit nodes in order to arrive at the destination node D (to which the requested terminating subscriber is connected). This route description information is also referred to as routing information or source routing information or, specifically in the case of ATM-PNNI networks, is referred to as DTL stack (=stack of Designated Transit List information elements).

Said ATM communications networks can be organized into numerous subnetworks ("peer groups"), comprising physical switching nodes and physical connecting lines ("physical links"). According to the PNNI protocol, the nodes of a (hierarchically lowest) peer group determine from among them a so-called representative node ("peer group leader") which represents the entire peer group in the form of a single, logical, model-like node (referred to as "logical group node" or else "parent node") in a peer group which is of a hierarchically higher level.

A hierarchically higher peer group is formed, comprising a plurality of such parent nodes and the connecting lines which interconnect these in a model-like fashion, in which case a model-like connecting line (also referred to as "higher-level logical link") between two such parent nodes thus represents all those physical connecting lines which connect in each case two physical boundary nodes from the hierarchy region of the two adjacent parent nodes and, in doing so, have assigned to them, thanks to administrative specifications and an agreement algorithm, the same code in each case, referred to as aggregation token.

The hierarchy can continue recursively in further hierarchy levels: a peer group leader selection can also take place again in the hierarchically higher peer group. The peer group leader which is selected here represents again the entire hierarchy region established under it in a peer group which is hierarchically at the next highest level, as if this hierarchy region were a single node. In this peer group there are also logical, model-like connecting lines which are formed repeatedly, as described above.

A hierarchical model-like network in accordance with the PNNI protocol (for illustration purposes: 3-dimensional grid) is completed by adding further, purely logical connecting lines, the so-called "uplinks" which each connect, in accordance with the PNNI protocol, two nodes to one another (physically—if the node at the lower end of the uplink is a physical node—or logically) from peer groups which are at hierarchically different levels.

Thus, an uplink (also referred to as "initial uplink") leads from the boundary node of a hierarchically lowest peer group, which node is connected to a boundary node in an adjacent peer group, to a representative node, the so-called "upnode", i.e. to that representative node "ancestor node" (i.e. parent node, grandparent node or great . . . grandparent node) of the adjacent boundary node which is a directly neighboring node of precisely one specific ancestor node of the boundary node on this side in a common peer group of a hierarchically higher level. Such an (initial) uplink results in all the ancestor nodes (of the boundary node on this side) which however each belong to a hierarchically lower peer group than the aforesaid common hierarchically higher peer group, also each contribute an uplink (also referred to as "induced uplink") to the aforesaid upnode [lacuna] the hierarchy pattern.

The hierarchical structure, which is ultimately based on corresponding configuration data of the individual nodes, can be handled very flexibly here. In particular, the individual nodes of a great . . . grandparent peer group can have different numbers of subhierarchy levels together with the relevant peer groups.

The exchange, in accordance with PNNI protocol, of data packets, "hello packets" and PNNI topology status data packets ("PNNI topology state packets"—PTSPs) via so-called routing control channels ensures that each physical switching node of a hierarchically lowest peer group acquires the same knowledge of the topology of this group and of all the peer groups, including all the uplinks, which are located at a hierarchically higher level than it in the hierarchy, and also the same knowledge of the usage factor of all the nodes and connecting lines contained in it as well as the same knowledge of its properties (accessibility, capabilities, features, costs).

The knowledge of the topology which is acquired can be stored in a node in the form of a graph G1. In it, the respective current switching node (which has produced this graph G1 for itself) is not marked in particular as the source node S.

If a terminal which is connected to the source node then requests to be connected to the terminal of a specific destination address, the data in the graph G1 which are exchanged per PNNI routing protocol make it possible to determine that destination node D which indicates the accessibility of the destination terminal and at the same time belongs to the hierarchically lowest possible peer group. On the basis of the graph G1 it is possible to determine, in terms of a suitable minimization criterion, the best route from the starting node S to the destination node D.

The ATM Forum Technical Committee Private Network Node Interface (PNNI) in the specification, version 1.0, Annex H does not, however, provide the possibility of also including in the route search advantageous bypasses via one or more peer groups with a return to the peer group which has already been passed through, and as a result it is in the meantime not possible to fulfill a switching request appropriately.

These problems also occur in other communications networks, for example narrowband networks with source routing for implementing a PSTN (Public Switched Telephone Network). The topology information is evaluated only to the extent that routes are determined with the avoidance of bypasses.

SUMMARY OF THE INVENTION

The object of the method according to the invention consists in determining a route, while taking into account the topology information and the communications conditions relating to the nodes and connecting lines, and converting the route into routing information in such a way that the largest possible variety of routes can be taken into account.

The switching nodes are assigned to subnetworks and interconnected to one another as desired. The subnetworks here can be individual local communications networks of different service providers or groups of switching nodes of a superordinate communications network. In a source switching node there is topology information available on the node's own subnetwork and on the inter-connection with the subnetworks which are stored in the node or in a routing server. In addition, the communications conditions which are required for the communications connection to be set up are available to the source switching node.

By referring to the topology information, a subset of switching nodes and connecting lines which satisfies the communications conditions is selected and a route to the destination switching node is determined. Included in this process is a route which, in the direction from the source switching node to the destination switching node, leaves at least one subnetwork once and returns to said subnetwork in the further course of the route. The routing information is then formed from the route which is determined. The formation of the routing information is carried out either in the switching node itself or in external devices, for example routing servers, which can be connected to the switching node. The method according to the invention can be implemented, for example, in the Xpress switching nodes from Siemens AG.

On the basis of a topology graph which is based, for example, on the topology information acquired by the PNNI routing protocol, a possibly reduced topology graph is derived such that the remaining nodes and edges fulfill, inter alia, the conditions of the current connection request. It is ensured that the topology graph is not reduced too much so that bypasses are made possible in which it would be possible to pass through nodes and edges which belong to a higher hierarchical level than the destination node D.

A routing algorithm which is carried out on this basis results in a route which makes bypasses via other subnetworks, and it is thus in terms of the minimization criterion applied the instantaneously best route—for instance because no routes without bypasses are possible owing to the instantaneous network usage factor, or if they are possible they are less favorable. The latter is probable in particular if the networks/subnetworks (peer groups) are formed on the basis of organizational view-points (owners, departments, . . . ), but geographically cover the same area.

A communications connection which is set up according to this routing information will certainly also comprise bypasses which would be avoidable if a direct route were possible within a subnetwork while complying with the communications conditions. However, as a result of the method according to the invention, blocking within the subnetwork is avoided. The number of permitted routes is substantially expanded and the service providers of the communications network are presented with expanded configuration possibilities by virtue of the use of additional subnetworks for a connection set-up.

The advantageous configuration of the invention includes the voluntary limitation of the potential degree of bypasses. Here, the highest peer groups are advantageously removed, as it were voluntarily, from the topology graph. This aspect is important if private and public networks form a common hierarchy and, for example for reasons of cost, the bypass via public networks is to be prevented.

The switching nodes or subnetworks are advantageously implemented as a narrowband network or ATM network. The method according to the invention can, however, also be applied to hybrid forms of communications networks, with the result that only parts of the communications network are implemented in this way.

A particularly simple way of implementing the method according to the invention is obtained if at least some of the switching nodes operate according to the principles of the Private Network Node Protocol (PNNI). The switching nodes of a subnetwork are represented here by a complex switching node in the topology information. The hierarchical structuring of parts of the communications network is made easier in this way. In addition, a reduction in expenditure is obtained in terms of the determination of routes, which is advantageously carried out according to the Dijkstra algorithm.

According to a further advantageous refinement of the method according to the invention, the connecting lines between two switching nodes are handled separately in both traffic directions. This is effected in that, for example, each undirected edge is replaced by in each case two oppositely directed edges, each individually directed edge being assigned both forward and rearward attributes.

In this way, the one directed edge can remain in the topology graph while the oppositely directed edge is removed if the communications requirements are such that the connection set-up is made possible only in the one direction. Here, an oppositely directed downlink is incorporated into the topology graph for each uplink. On the other hand, the Dijkstra routing algorithm ensures that only monotonously directed edge sequences result as routes.

Thus, a connection line can be passed through in one direction during a connection set-up even if specific communications conditions are not fulfilled in the other direction.

When the communications conditions are not fulfilled by a switching node or a connecting line, making it impossible, for example, to set up a connection via the previously determined route or to clear a connection, the respective switching node or the respective connecting line is signalled to the source switching node or an initial switching node of the corresponding subnetwork, in response to which the latter can perform a new route determining process.

During the route determining process, according to developments of the invention, the routes with the shortest connecting lines or the lowest number of switching nodes to be passed through are selected. In this process, if appropriate, geographic information on the switching nodes may be accessed. If the topology information advantageously contains cost-specific information, the route with the lowest costs is selected. During the selection of the most favorable route, the following minimization criteria may therefore be taken into account individually or in a combined fashion:

Number of nodes to be passed through,
The sum of the distances between the nodes to be passed through,
The delay time of the transmission (cell transfer delay),
Variation in the delay time of a transmission (cell delay variation),
Transmission costs.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

1st Exemplary Embodiment

2nd Exemplary Embodiment

Figure 4:
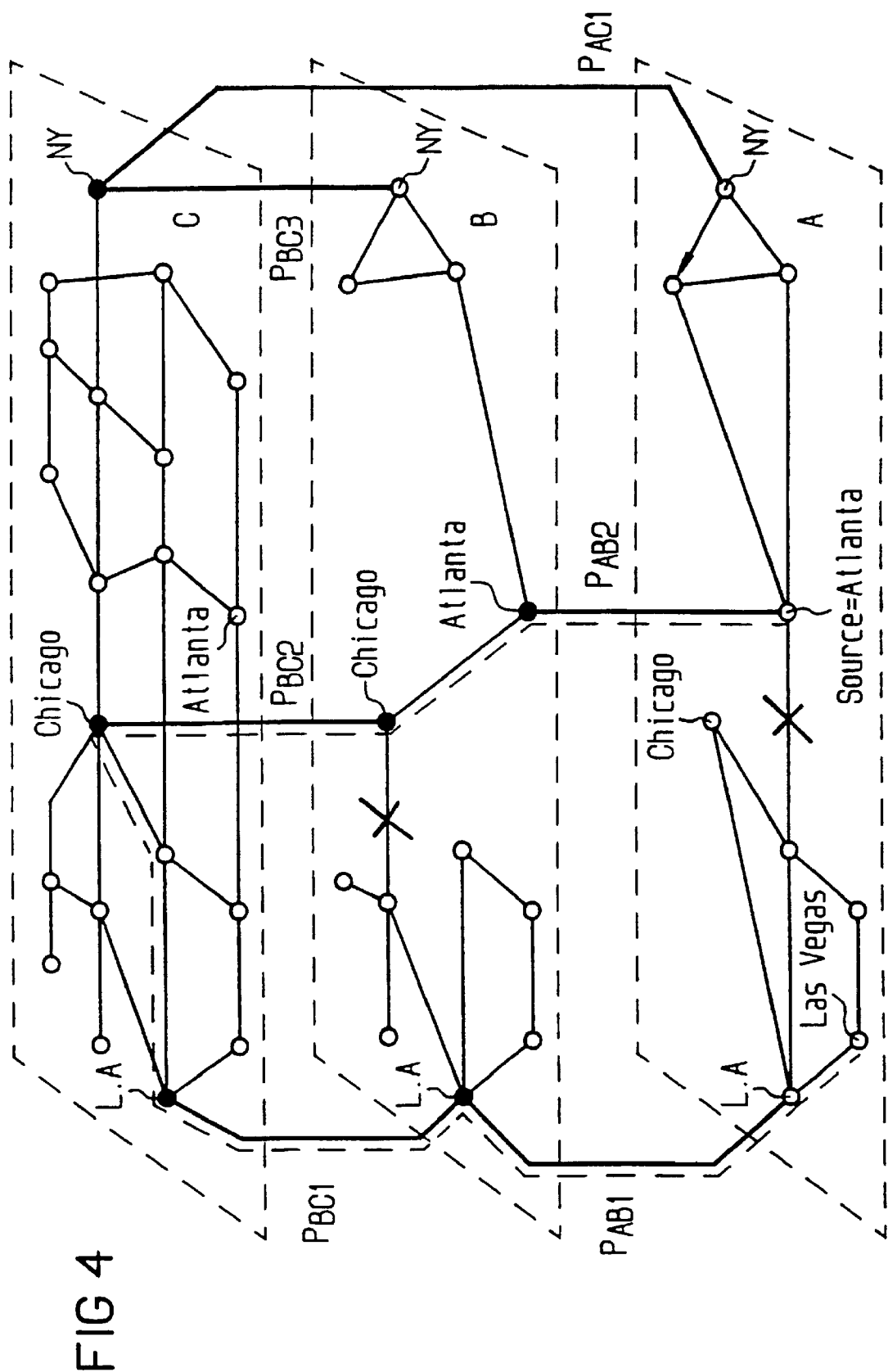
Figure 7:
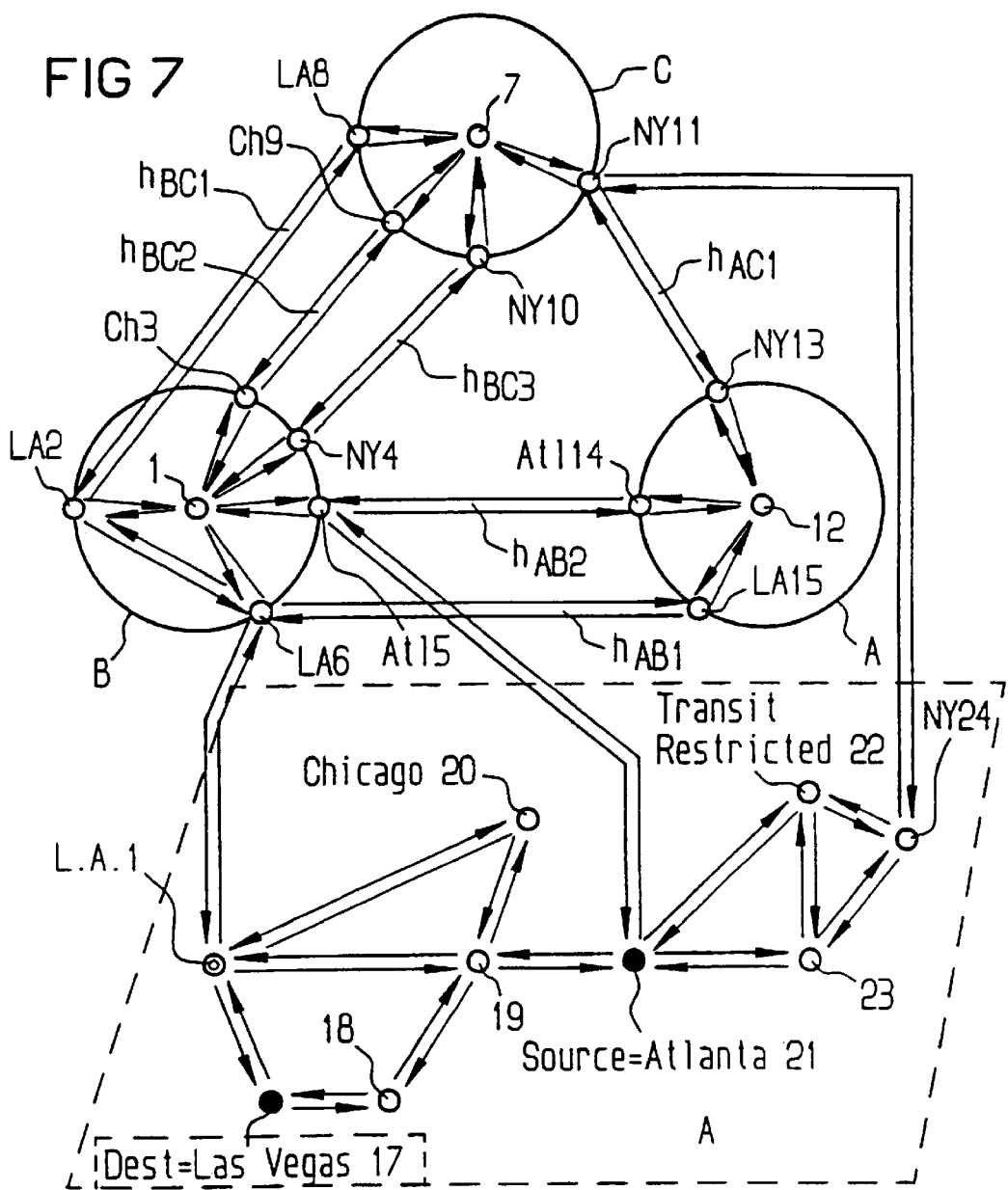
Figure 8:
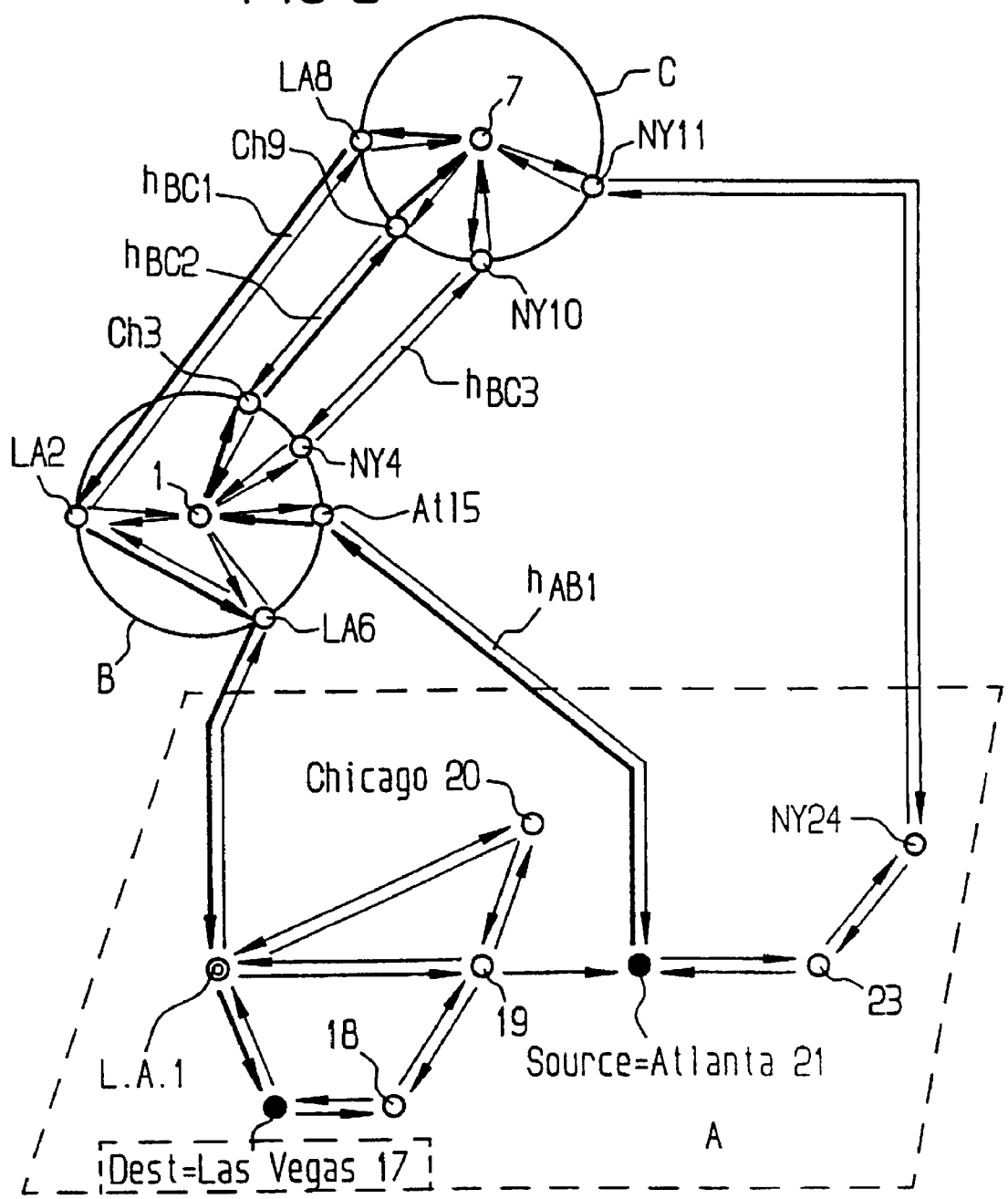
Figure 10:
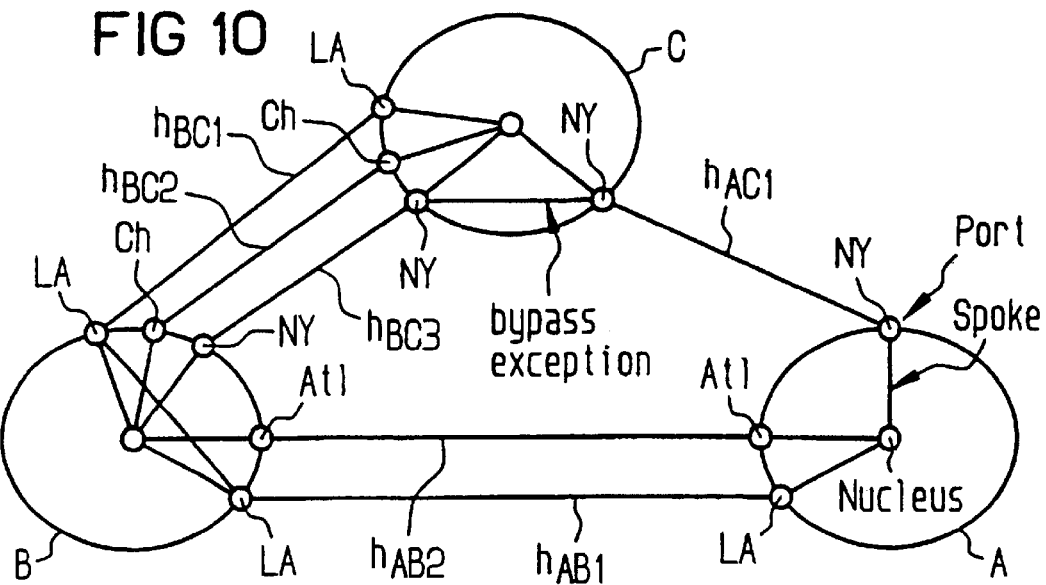
Figure 11:
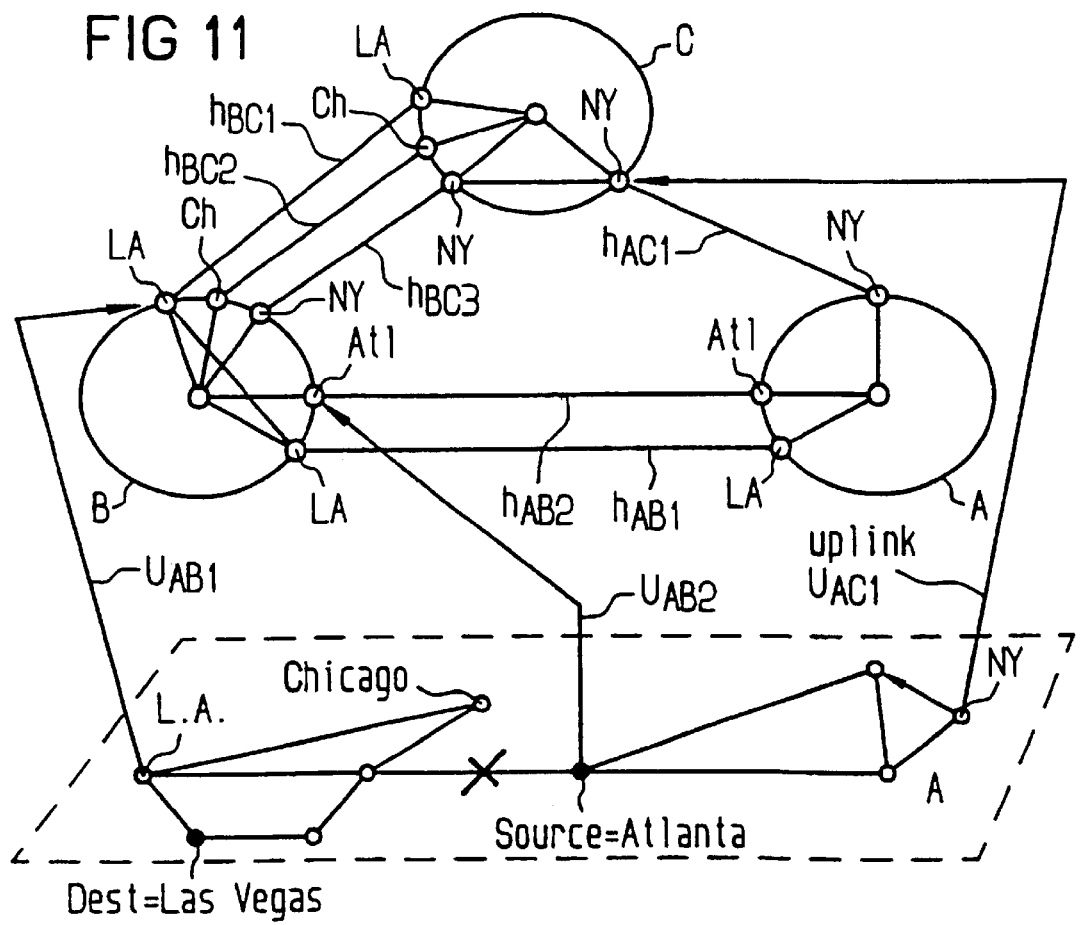

FIG. 4 shows a network topology of an ATM communications network,

FIG. 10 shows network topology represented by complex nodes,

FIG. 11 shows a topology graph for a node of subnetwork A,

FIG. 7 shows a topology graph for a node of subnetwork A with independent traffic directions, FIG. 8 shows a route which has been determined.

3rd Exemplary Embodiment

Figure 5:
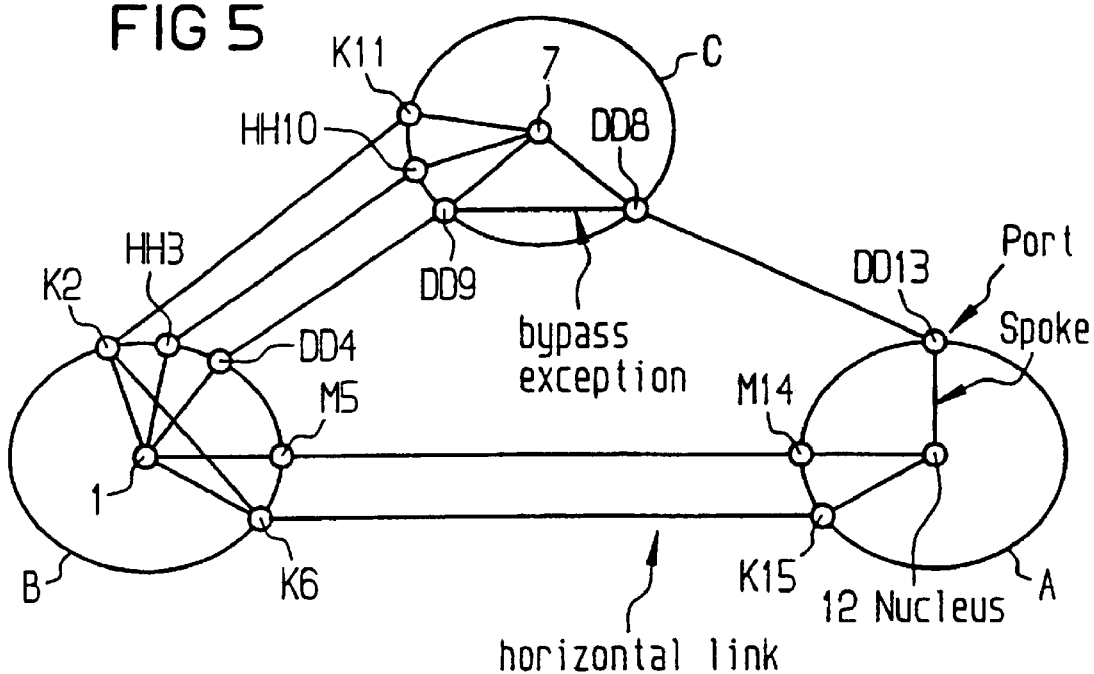
Figure 6:
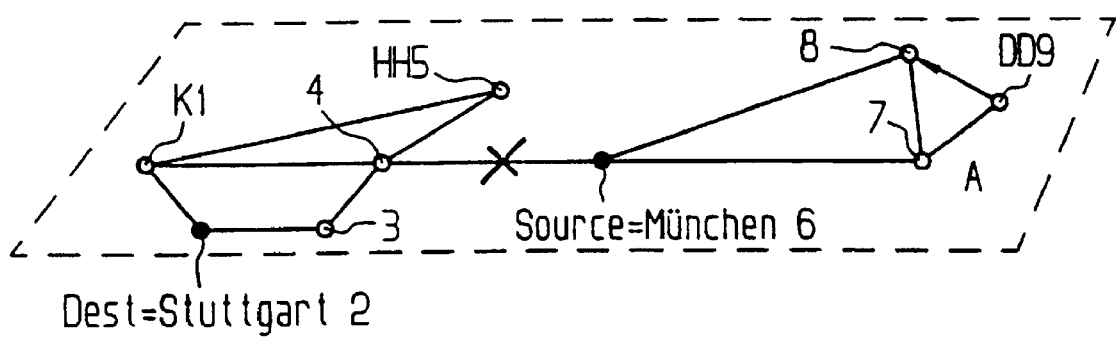
Figure 9:
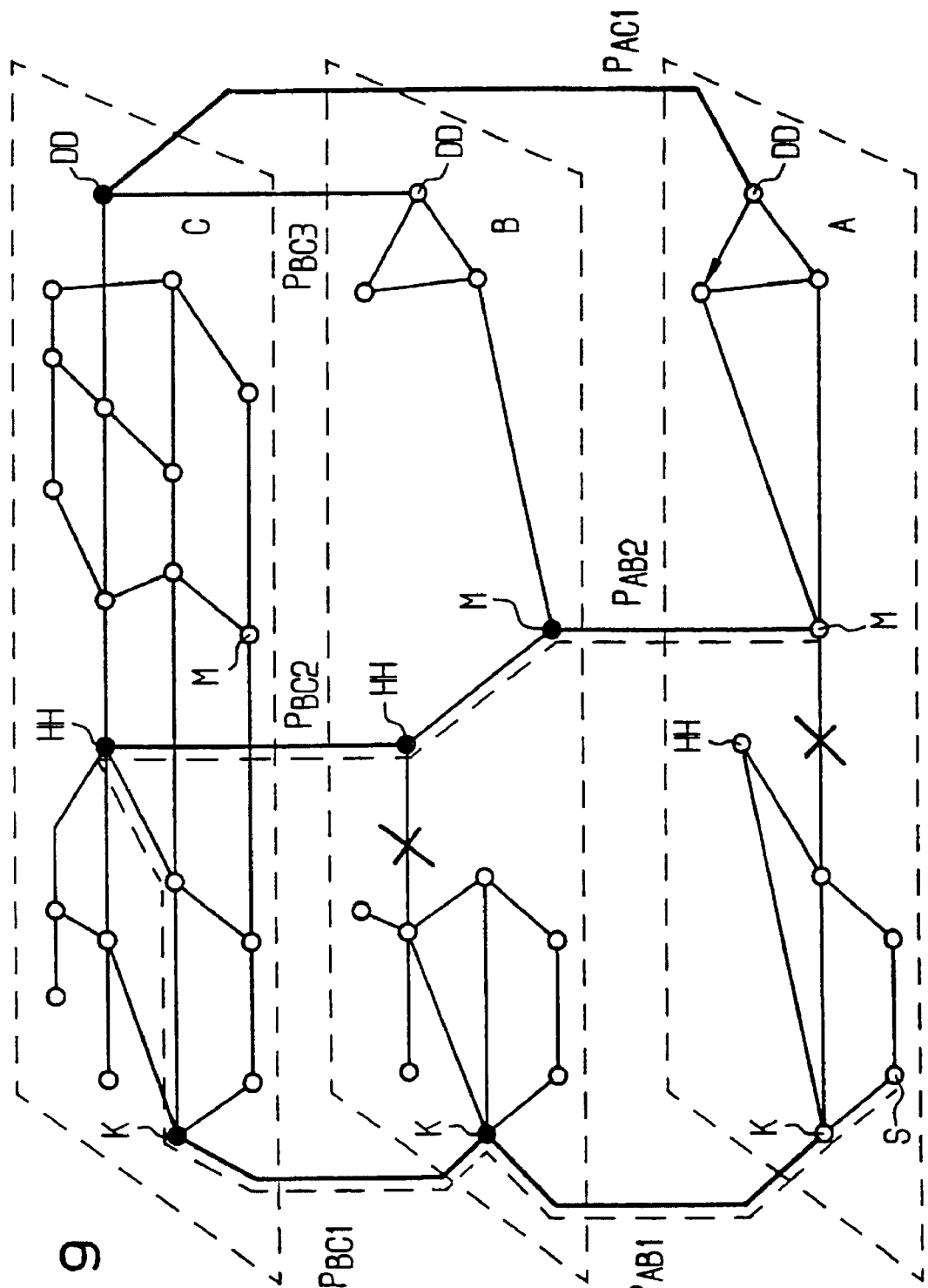
Figure 12:
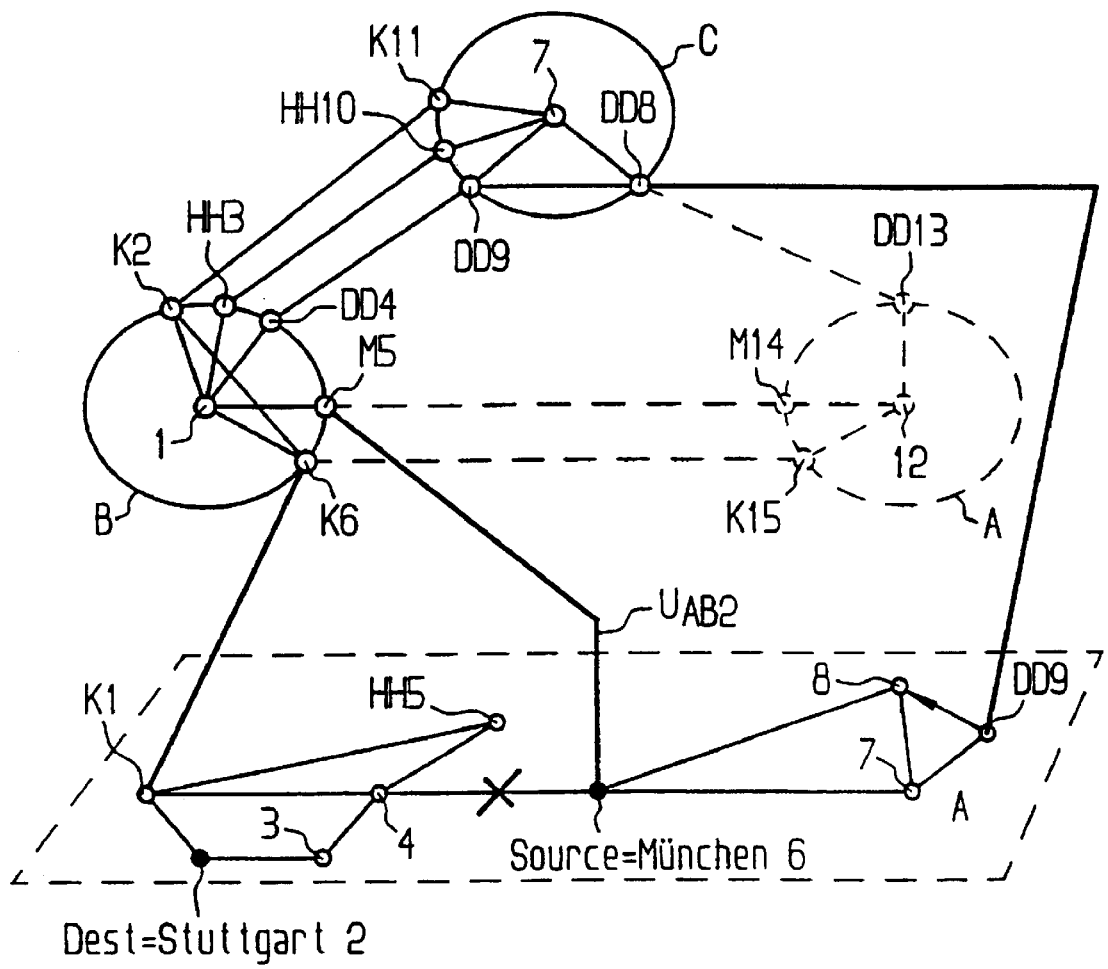
Figure 13:
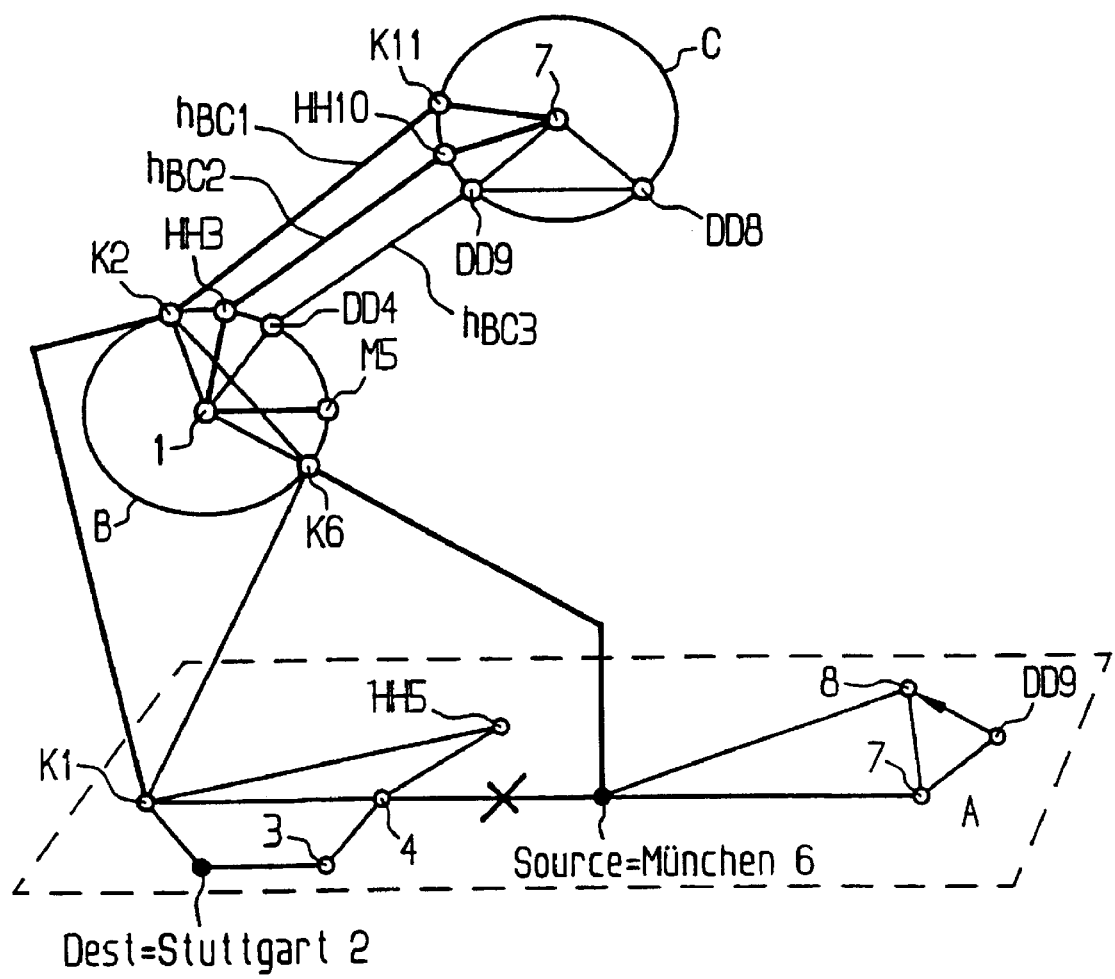

FIG. 9 shows a network topology of a narrowband communications network,

FIG. 5 shows network topology represented by complex nodes,

FIG. 6 shows a topology graph for a node of subnetwork A,

FIG. 12 shows a topology graph for a node of subnetwork A with independent traffic directions, FIG. 13 shows a route which has been determined.

DESCRIPTION OF THE PREFERRED EMBODIMENTS

1st Exemplary Embodiment (PNNI Network with Only Simple Nodes)

In a first exemplary embodiment (FIGS. 1 to 3), a graph G2 is determined which, with reference to the scenario of an ATM communications network described at the beginning, is derived from the aforesaid graph G1 by removing from graph G1 all those nodes and connecting lines which do not comply with the communications conditions.

Subsequently, an optimum connection path is determined such that bypasses via hierarchically higher peer groups with subsequent return to hierarchically lower peer groups which have already been passed through are also taken into account. Here, the exit nodes and re-entry nodes for one and the same peer group are different; otherwise such a detour would constitute an extremely unnecessary loop and not an optimum connection path.

Even if the following exemplary embodiment concentrates on detour-like routes, it must not be forgotten that, for normal cases in which a best, detourless route is available, the method according to the invention also finds said route and equally correctly forms the corresponding routing information for it.

The resulting optimum route can in principle contain any desired number of transitions from a hierarchically higher peer group to a hierarchically lower peer group and, vice versa, from a hierarchically lower peer group to a hierarchically higher peer group, in which case at each individual transition in principle any desired number, i.e. zero, one, two, . . . or n<=102 hierarchy levels may be skipped.

In accordance with the PNNI protocol, the connection set-up message is also given the routing information as a consequence of information elements, so-called "Designated Transit List information elements (DTLs)", a preceding information element (repeat indicator) indicating the stack-like handling of these DTLs (push and pop operations). Here, each information element DTL contains the description of precisely one route through precisely one hierarchical peer group in the form of one or more node links (also referred to as edge later) pair specifications and a pointer which points to one of these node link pairs.

The route which is described from the uppermost information element DTL of the push-down storage starts here with the source node S and contains only specifications relating to nodes and connecting lines in the hierarchically lowest peer group and ends, if appropriate, with the specification of an uplink which leads to an upnode at which the route continues, specifically in the way described in the next lowest stacked DTL.

Each next lowest DTL in the push-down storage contains specifications for, in each case, one route through the hierarchically next highest peer group, said specification starting with the specification of the relevant ancestor node of the source node, possibly followed by further node and connecting line specifications from the same peer group and a possible uplink specification as termination. The lowest DTL in the stack contains specifications relating to a route through the hierarchically highest peer group required, starting with the specification of the relevant ancestor node of the source node and ending at a node in whose hierarchy region the destination node with the connected destination terminal is located.

The described design of the DTL push-down storage in accordance with the PNNI protocol initially gives the impression that it would be impossible to take into account routes which comprise any desired sequences of hierarchically higher and hierarchically lower nodes, and that it is actually indicated to design the algorithm for searching an optimum connecting path in such a way that routes which such sequences (that is to say with bypasses via hierarchically higher peer groups) are excluded from the outset, as is the case in the specifications of the PNNI protocol, version 1.0, Annex H.

However, the method according to the invention solves the problem of describing a route containing bypasses in such a form that the rules of the PNNI protocol are satisfied.

It is characteristic of the solution of the first exemplary embodiment that from a prescribed sequence of hierarchically higher and hierarchically lower nodes, in which sequence uplinks would certainly also have to be passed through in the downward direction, an equivalent sequence of nodes and connecting lines is derived which never runs in a descending fashion in terms of the hierarchy levels of these nodes and in which therefore uplinks never have to be passed through in the downward direction. As an attribute of what is achieved in this way, one and the same hierarchically higher (logical) node can occur repeatedly in the sequence (loops) but, owing to the connecting lines which are specified, it is clearly ensured that the exit and re-entry boundary nodes in the relevant child peer groups are always different, which ultimately means that one and the same physical node is never passed through more often than once.

Below, the determination of the best route in a switching node which determines the route and the routing information is explained for the first exemplary embodiment:

A graph G3 is derived from the abovementioned graph G2 by removing all the ancestor nodes of the source node S, likewise all the (horizontal) connecting lines which lead away from said nodes and which would lead from precisely these ancestor nodes to their adjacent nodes in the corresponding hierarchically higher peer groups, and all the induced uplinks leading away from these ancestor nodes in the upward direction.

In accordance with the PNNI protocol, a best route is determined in a known manner, for example using the Dijkstra routing algorithm, from the source node S to the destination node D based on the graph G3, the uplinks remaining in the graph G3 having to be treated no differently than all the other (horizontal) connecting lines.

The sequence F1 in general notation:
node-n(=D), link-n−1, . . . , node-i+1, link-i, . . . , link-1, node-1(=S)
is obtained as best route.

It is in the nature of the Dijkstra routing algorithm that the respective best route is determined not only to a single, specific destination node D, but rather to all nodes of the network, and afterwards the route of interest, for example to the destination node D, is picked up. By means of the Dijkstra algorithm, this route is initially determined here in the form of the sequence F1.

Then, the sequence is turned about and the sequence F2:
node-1(=S), link-1, . . . , link-i, node-i+1, . . . , link-n−1, node-n(=D)
is formed.

The physical source node-1=S is naturally of the hierarchically lowest level. All the other nodes must, according to the invention, be in order, as often as desired, hierarchically higher or hierarchically lower physical or logical nodes. In particular, the destination node node-n=D must not necessarily be the hierarchically highest of the nodes occurring in the sequence.

A link, link-i, proves to be horizontal if node-i and node-i+1 are assigned to the same hierarchy level, that is to say belong to the same hierarchical peer group. A link, link-i, proves to be an uplink in the upward direction (or downward direction) if the hierarchy level from node node-i is smaller (or larger) than the hierarchy level from node node-i+1.

According to the invention, from the sequence F2 a sequence F3 is derived, in which the nodes in the prescribed sequence never descend in terms of their hierarchy level. Switching nodes and links from F2 are, if appropriate, replaced or canceled out by others here. For this purpose, an auxiliary variable, referred to here as a CurrentNodeLevel, which is initialized with the hierarchy level of the node node-1=S, is used, together with a second Boolean auxiliary variable, referred to here as BelowHighestReachedLevel, which is initialized with FALSE. In an iteration loop, all the components of the sequence F2 (the links and the nodes) are run through, starting at source node node-1=S, and in the meantime replacements or cancellations are carried out—see the following algorithm:

BelowHighestReachedLevel := FALSE;

current_node := node-1;//i.e. = Source Node S

CurrentNodeLevel := Hierarchy level of the current_node;

for i:=1 step 1 to n−1 do
if hierarchy level of the node-i+1 is lower than
    CurrentNodeLevel then
      if BelowHighestReachedLevel = FALSE then
        determine that ancestor node of node-i+1 whose hierarchy level is equal to the CurrentNodeLevel. Replace link-i, which is an uplink passed through in the downward direction, with the associated horizontal link (with the same aggregation token). How to do this: see Subtask-1 after this algorithm. Replace node i+1 with the ancestor node which has been determined. BelowHighestReachedLevel:= TRUE;

else
        cancel link-i and node-i+1 from the sequence.
      end
    else
      if BelowHighestReachedLevel = TRUE then
        replace link-i with that assigned (induced) uplink or else horizontal link which starts from the level given by CurrentNodeLevel and leads to the node i+1. How to do this: See Subtask-2 after this algorithm. Node-i+1 is retained unchanged in the sequence. BelowHighestReachedLevel := FALSE;
      else
        retain link-i and note-i+1 unchanged in the sequence.
      end
    CurrentNodeLevel := Level of node-i+1;
end
Next i;
Subtask-1:

Determine the associated horizontal link in the hierarchically higher peer group for a prescribed uplink:

The graph G1 has m links (horizontal links and uplinks taken together). The number k from the set 1,2, . . . , m represents a pointer to the interesting information relating precisely to one link (for example its identity specifications). In particular, assume that there is a table RelationTbl with m elements. The elements represent the assignment chain from the initial uplink to the possibly induced uplink, to the uplink which is possibly derived therefrom again, etc., to the horizontal link induced therefrom in a hierarchically higher peer group:

RelationTbl[$j_1$] := $j_2$; // if there is no value k of 1 to m with RelationTbl (k):=$j_1$, $j_1$ is the initial uplink RelationTbl[$j_{q-1}$] := $j_q$;

. . .

RelationTbl[$j_{r-1}$] := $j_r$;

. . .

RelationTbl[$j_{s-1}$] := $j_s$;
RelationTbl[$j_s$] := 0;

which means:
link- $j_1$ is uplink and induces link- $j_2$
link- $j_{r-1}$ is uplink and induces link- $j_r$
link- $j_{s-1}$ is uplink and induces link- $j_s$
link- $j_s$ is a horizontal link.
// If there is no value $j_{s-1}$ of 1 to m with RelationTbl ($j_{s-1}$):=$j_s$, but there is an entry RelationTbl[$j_s$] := 0, $j_s$ is a horizontal link in a hierarchically lowest peer group.

Assuming that the link-i to be replaced corresponds to $j_{q-1}$, the table RelationTbl is run through until RelationTbl [$j_s$] := 0 is arrived at. $j_s$ defines the horizontal link to be used.
Subtask-2:

For all the m links of the graph G1 there is a table of the type:
LinkLevelTbl[k] = lowest hierarchy level of the two boundary nodes of the link k; for all k=1, . . . m. link-i is designated by $j_{q-1}$. The table RelationTbl is run through starting from RelationTbl[$j_{q-1}$] in order to pass from one link to the next link, and, in the process, CurrentNodeLevel is continuously compared with the entries in LinkLevelTbl. Assuming that the value of CurrentNodeLevel is equal to the value of LinkLevelTbl[$j_{r-1}$], $j_{r-1}$ identifies the searched-for link which is to replace link-i.

From the sequence F3, it will be assumed that a sequence F4 is formed, for example as follows:
for i:=1 step 1 to n-1 do
if link-i=uplink then insert after link-i that ancestor node from source node S which is of the same hierarchy level as node-i+1. In turn, insert after that horizontal link H which is assigned to the link-i by virtue of the identical aggregation token (the RelationTbl is run through starting at $j_1$=link-i and H=$j_s$ is found).

end next i;

From F4, a sequence of DTLs is formed by breaking up the sequence F3 after each uplink, and from each subsequence which is generated in this way a DTL information element with PNNI protocol-compatible syntax is formed, which completely describes the task according to the invention for the source node S.

According to the invention, a loop can be integrated (in the terms of the method according to the invention this is a bypass via one or more peer groups with return to a peer group which has already been passed through at a re-entry node which has not yet been passed through) even when the information elements of the routing information are fulfilled again when the connection set-up message arrives in a physical switching node (transit node) to be passed through. This is clarified below with reference to the arrival of a connection set-up message in the first physical switching node of a hierarchically lowest peer group:

If the peer group which is the hierarchically lowest at a given moment is exited when a connection set-up message is being passed on, the relevant uppermost DTL in the stack must have previously been removed. If even a certain hierarchy range is exited, all those uppermost information elements DTL in the stack which contain routing sections through the respective peer groups of the hierarchy region to be exited must previously have been removed. If a peer group which is hierarchically the lowest is re-entered when a connection set-up message is being passed on, new routing sections must be determined and new relevant DTLs must be formed. The pointers in the individual DTLs must always have been set and/or moved forward in such a way that when a connection set-up message is received the pointers of all the received DTLs each point to a node link pair which contains either the received physical node which is the lowest in the hierarchy or else one of its ancestor nodes.

The boundary node (S') determines, as entry node into a further peer group, a new best route section as far as a destination node D'. The destination node D' is to be taken from the node link pair which follows the node link pair in the DTL which is uppermost in the stack of the received DTLs and to which the relevant pointer points.

If this is not possible because the pointer is already pointing to the last node link pair, the same applies with respect to the next lowest DTL in the stack, and so on. It is within the spirit of the invention that the PNNI protocol prescribes that the received link specification, namely how a node D' is arrived at, must also be complied with completely. Any attempt, for example to get there in a better way, could certainly produce a better route section, but at the same time could also lead to the hierarchy region represented by the destination node D' not being entered at the expected boundary node, from where the continuation of the connection set-up could finish up in a dead end. That is to say in addition to D' the horizontal link Link-to-D' is also determined. Link-to-D' is taken from the node link pair which belongs to that DTL in which D' is located and to which the relevant pointer points during the reception of the DTL.

The boundary node S' which considers that it is only a transit node for the present connection set-up request and that the received DTL push-down storage is incomplete, therefore forms, on the basis of its own graph G1, a possibly reduced graph G1', as follows:

All the nodes—together with the adjacent links—with a hierarchy level which is greater than or equal to the hierarchy level of the node D' are removed from the graph G1, but not D' itself and also not those uplinks for which D' is an upnode and are at the same time assigned to the Link-to-D'. That is to say for all uplinks which have D' as an upnode the following test is made:

As in Subtask-1, a $J_{q-1}$ can be assigned to an uplink. The table RelationTbl will be run through starting from RelationTbl[$j_{q-1}$] until an entry RelationTbl[$j_s$] :=0 is arrived at. If $j_s$ corresponds to Link-to-D', the uplink can remain in the graph G1'. Otherwise, it is removed. The graphs G2' and G3' are formed on the basis of G1', by complete analogy with the way that the source node S formed the graphs G2' and G3', and a DTL stack is determined as described above, S' performing the function of S and D' performing the function of D (see description above).

All the DTLs, with the exception of the last-but-one (which contains D') are transferred from the resulting DTL push-down storage and the DTL push-down storage to be passed on is thus completed.

Figure 1:
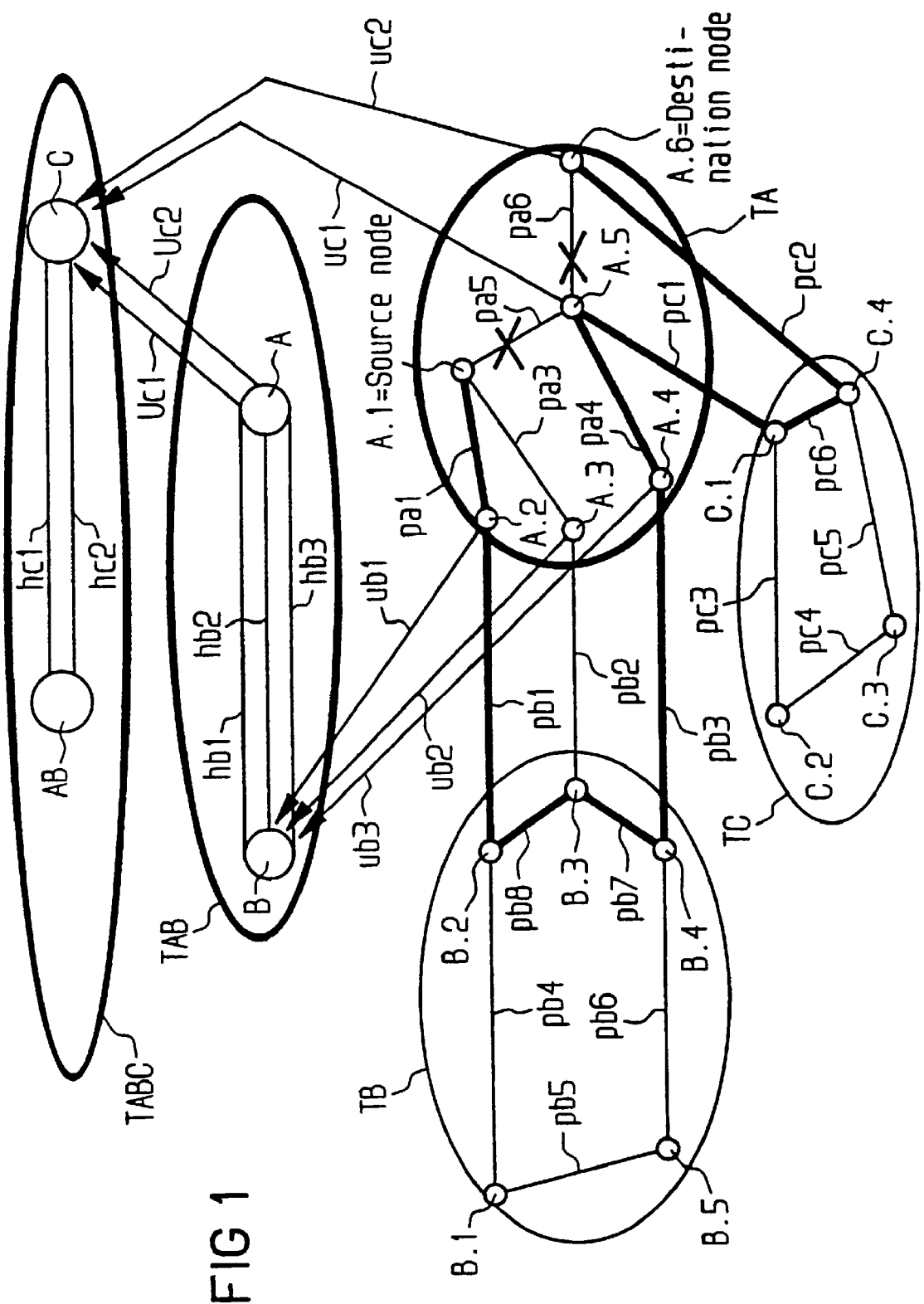
FIG. 1 shows an ATM communications network from the point of view of the source switching node A.1.
Figure 2:
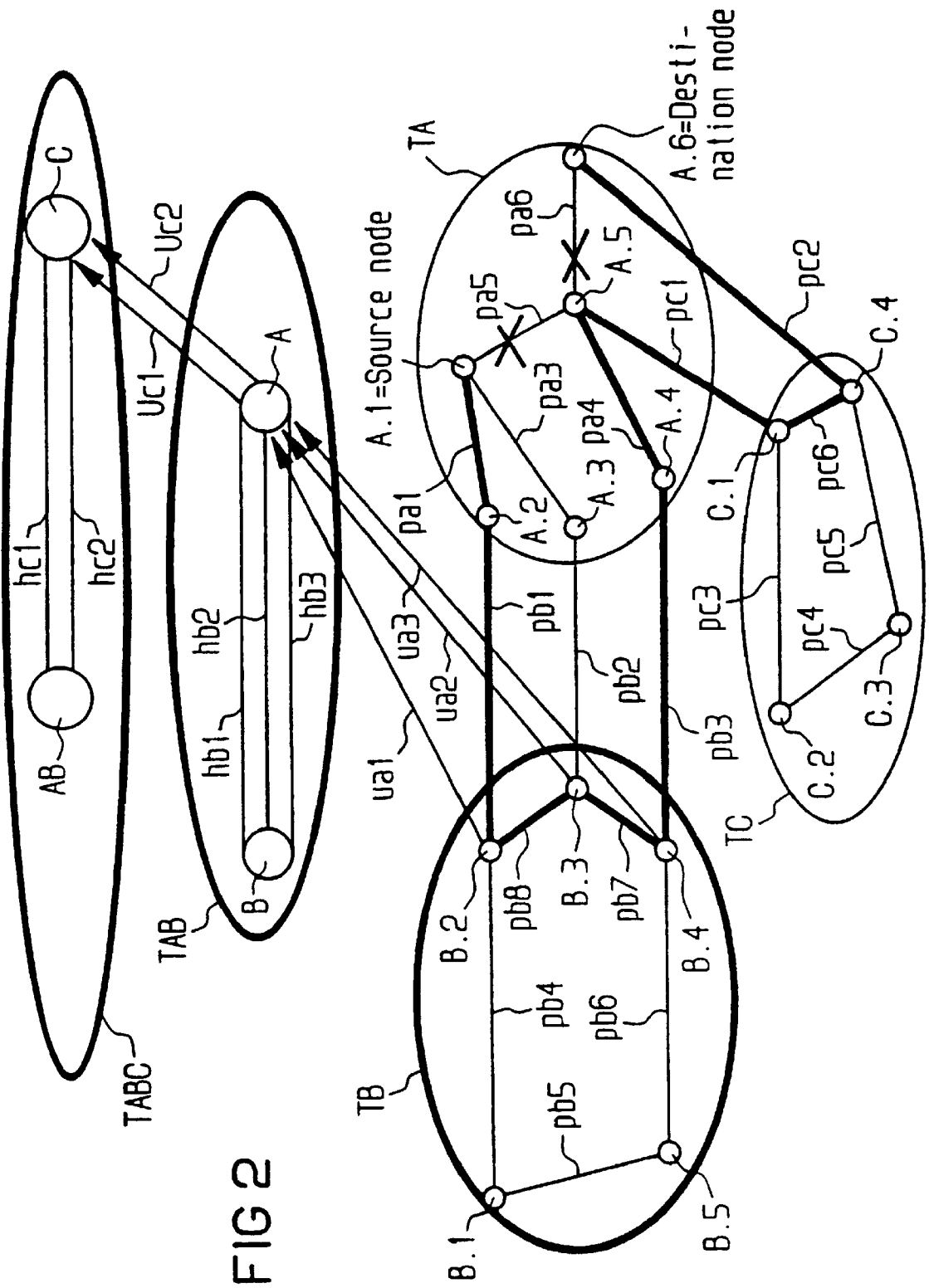
FIG. 2 shows an ATM communications network from the point of view of the transit switching node B.2
Figure 3:
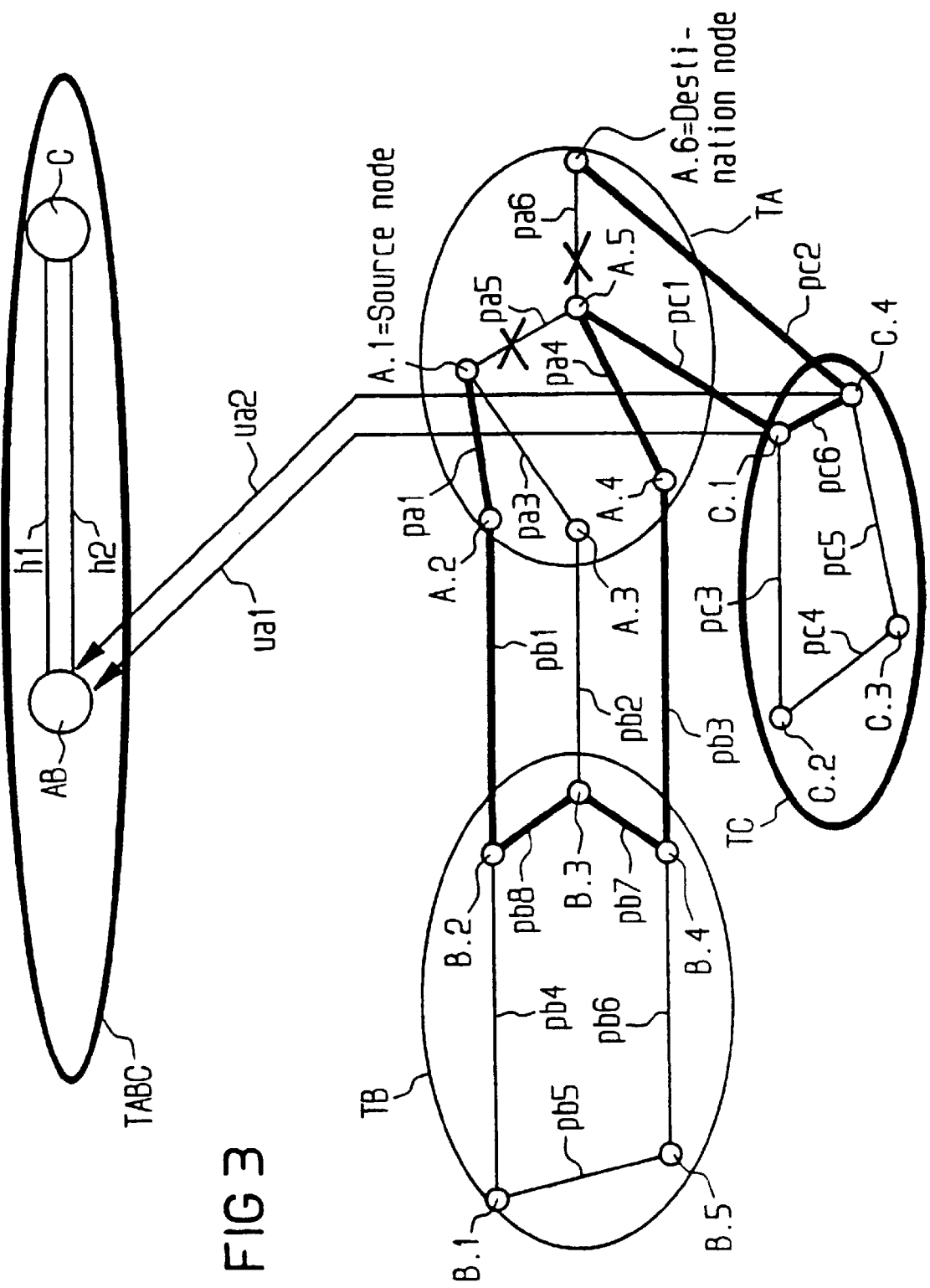
FIG. 3 shows an ATM communications network from the point of view of the further transit switching node C.1.

The formation of the routing information in the switching node of an illustrated ATM communications network will be explained with reference to FIGS. 1 to 3. Here, FIGS. 1 to 3 show one and the same ATM communications network for a routing search and the formation of routing information, but viewed from different switching nodes.

The hierarchy structure of the ATM communications network shows three subnetworks TA, TB, TC by way of example. The first subnetwork TA comprises the physical nodes A.1 . . . 6. For the connection set-up in question, the node A.1 is the source switching node and the node A.6 is the destination switching node. However, these source and destination nodes do not have to be located in the same peer group (subnetwork); in addition, bypasses can be made only through a transit node. A further subnetwork TB comprises the nodes B.1 . . . 5 and an additional further subnetwork TC comprises the nodes C.1 . . . 4. The subnetworks TA, TB (peer groups of the lowest hierarchy level) are combined at a higher hierarchy level to form a network group TAB (peer group of a higher hierarchy level) and are each represented by a logical node A, B. At a still higher hierarchy level, this network group TAB (peer group) is combined with the further additional subnetwork TC to form a network group TABC, one logical node AB representing the network group of a higher hierarchy level TAB and one logical node C representing the further additional subnetwork TC.

The nodes are connected to one another by means of physical connecting lines (physical links). Links pb1,2,3 and pc1,2 between nodes of different subnetworks are assigned additional information.

Legend:

Initial vector
  p=physical link,
  h=horizontal link,
  u=initial uplink,
  U=induced uplink pb1, hb1, and ub1, or pb2, hb2, and ub2 or pb3, hb3, and ub3 or pc1, uc1, Uc1 and hc1 or pc2, uc2, Uc2 and hc2 are distinguished, by way of example, with a respective identical aggregation token.

The nodes in which the routing information is formed according to FIGS. 1 to 3 see only in each case the peer groups outlined by thick lines (the knowledge base stored in the respective node comprises information on these peer groups). Instead of the physical connecting lines which lead out of the peer group which is lowest in the hierarchy, they see the relevant assigned uplinks. Only the respective boundary nodes themselves know about this assignment, but they do not communicate this information to the other nodes of the peer group.

A route from the source node A.1 to the destination node A.6 is searched for. The connecting lines pa5, pa6 which would permit a direct route from the source node A.1 to the destination node A.6 are blocked. The physical path which the connection set-up should take is shown by a thick line.

Activity of the source node A.1:

In the source node A.1, the graph G1 will be stored in the form of a list of links together with their boundary nodes, i.e. G1(A.1)—see FIG. 1:
(pa2: A.2, A.1), (pa3: A.3, A.1), (pa4: A.4, A.5), (pa5: A.5, A.1), (pa6: A.6, A.5),
(ub1: A.2, B), (ub2: A.3, B), (ub3: A.4, B),
(uc1: A.5, C), (uc2: A.6, C).
(hb1: B, A), (hb2: B, A), (hb3: B, A),
(Uc1: A, C), (Uc2: A, C),
(hc1: C, AB), (hc2: C, AB), The blocked lines are removed, specifically (pa5: A.5, A.1), (pa6: A.6, A.5), and
the graph G2 (A.1) is determined:
(pa2: A.2, A.1), (pa3: A.3, A.1), (pa4: A.4, A.5),
(ub1: A.2, B), (ub2: A.3, B), (ub3: A.4, B),
(uc1: A.5, C), (uc2: A.6, C).
(hb1: B, A), (hb2: B, A), (hb3: B, A),
(Uc1: A, C), (Uc2: A, C),
(hc1: C, AB), (hc2: C, AB), All the ancestor nodes together with the adjacent lines are removed, namely
(hb1: B, A), (hb2: B, A), (hb3: B, A),
(Uc1: A, C), (Uc2: A, C),
(hc1: C, AB), (hc2: C, AB),
and thus graph G3 (A.1) is determined:
(pa2: A.2, A.1), (pa3: A.3, A.1), (pa4: A.4, A.5),
(ub1: A.2, B), (ub2: A.3, B), (ub3: A.4, B),
(uc1: A.5, C), (uc2: A.6, C).

The application of the Dijkstra routing algorithm produces the sequence F1:
Destination Node D = A.6, uc2,C, uc1,A.5, pa4, A.4, ub3, B, ub1, A.2, A.1=Source Node S.

The reverse order = F2 is:

Source Node S=A.1, pa2,A.2, ub1, B, ub3, A.4, pa4, A.5, uc1, C,uc2, A.6 = Destination Node D.

The sequence F3 is determined:

A.1, pa2, A.2, ub1, B, hb3,A, Uc1, C, hc2, AB.

The sequence F4 is determined:

A.1, pa2, A.2, ub1, A, hb1, B,hb3,A, Uc1,AB, hc1, C, hc2, AB.

The information elements of the DTL push-down storage are derived from this. The sequence F4 is split up after each uplink and from each of the subsequences produced an information element DTL is formed which indicates how they are transmitted to the next physical node. The pointer points to the x-th bracketed node link pair.
1. DTL: (A.1, pa2), (A.2, ub1), pointer=2
2. DTL: (A, hb1), (B, hb3), (A, Uc1), pointer=1
3. DTL: (AB, hc1), (C, hc2), (AB,x'00 00 00 00), pointer=1

The activity of the transit node B.2 (entry node in the further subnetwork TB):
The transit node B.2 receives the following routing information ri:

1. DTL: (A, hb1), (B, hb3), (A, Uc1), pointer=2
2. DTL: (AB, hc1), (C, hc2), (AB,x'00 00 00 00), pointer=1

Node B.2 has stored the network which it can see, as a graph G1 (B.2)—see FIG. 2, outlined by thick lines:
(pb4: B.1,B.2), (pb5: B.1,B.5), (pb6: B.4,B.5), (pb7: B.3, B.4), (pb8: B.2,B.3),
(ua1: B.2, A), (ua2: B.3, A), (ua3: B.4, A),
(hb1: B, A), (hb2: B, A), (hb3: B, A),
(Uc1: A, C), (Uc2: A, C),
(hc1: C, AB), (hc2: C, AB).

Because the traffic is transit traffic, G1' (B.2) is formed by determining first D' (B.2) and Link-to-D' (B.2):
D' (B.2) =A; Link-to-D' (B.2) =hb3.

In the transit node, all the nodes of the hierarchy level which is greater than or equal to the logical node A and the relevant adjacent links are removed from the graph G1 (B.2), with the exception however of D' (B.2) =A itself and excepting those uplinks for which A is an upnode and which are correlated with Link-to-D' (B.2)=hb3.

This produces the graph G1' (B.2):
(pb4: B.1,B.2), (pb5: B.1,B.5), (pb6: B.4,B.5), (pb7: B.3, B.4), (pb8: B.2,B.3),
(ua3: B.4, A)

Since no blockages at the transit node B.1 are known, it is true that graph G1' (B.2) =graph G2' (B.2). Since it is not possible for any ancestor nodes of B.1 to be further away from this, it is true that G1' (B.2) =G2' (B.2) =G3' (B.2).

The Dijkstra algorithm which is applied yields a sequence F1:
D' (B.2)=A, ua3, B.4, pb7, B.3, pb8, B.2=S' (B.2)

In the reverse order this results in F2:
S' (B.2)=B.2, pb8, B.3, pb7, B.4, ua3, A=D' (B.2)

The operation to form F3 does not produce any changes, i.e. sequence F2 =sequence F3.

Sequence F4 is formed from sequence F3:
S' (B.2)=B.2, pb8, B.3, pb7, B.4, ua3, B, hb3, A=D' (B.2)

The information elements DTLs of the routing information ri are formed from sequence F4:
1. DTL: (B.2, pb8), (B.3, pb7), (B.4, ua3), pointer=2
2. DTL: (B, hb3), A=D' (B.2), pointer=1
the last (=2.) DTL of which is not transferred.

The following routing information ri is thus sent in the DTL push-down storage format from the entry node B.2 to the further node B.3 in the further subnetwork TB:
1. DTL, newly formed:
(B.2, pb8), (B.3, pb7), (B.4, ua3), pointer=2
2. DTL, received and further processed:
(A, hb1), (B, hb3), (A, Uc1), pointer=2
3. DTL, received and further processed:
(AB, hc1), (C, hc2), (AB,x'00 00 00 00), pointer=1

Activity of the transit node A.4 in the first subnetwork TA:
The node A.4 receives the following routing information ri:
1. DTL: (A, hb1), (B, hb3), (A, Uc1), pointer=3
2. DTL: (AB, hc1), (C, hc2), (AB,x'00 00 00 00), pointer=1

Node A.4 has stored the network which it can see as a graph G1 (A.4) which corresponds to the graph G1 (A.1) stored by the source node A.1, see above and see FIG. 1 (outlined in thick lines).

Because the traffic is transit traffic, G1' (A.4) is formed by firstly determining D' (A.4) and Link-to-D' (A.4):
D'(A.4) = C
Link-to-D' (A.4) = hc1.

All the nodes from the hierarchy level which is greater than or equal to the hierarchy level of D' (A.4) = C, and the relevant adjoining links, are removed from the graph G1 (A.4), but with the exception of D' (A.4) = C itself and excepting those uplinks for which D' (A.4) = C is an upnode and which are correlated with Link-to-D' (A.4) = hc1.

Graph G1' (A.4) is produced:
(pa2: A.2, A.1), (pa3: A.3, A.1), (pa4: A.4, A.5), (pa5: A.5, A.1), (pa6: A.6, A.5),
(ub1: A.2, B), (ub2: A.3, B), (ub3: A.4, B), (uc1: A.5, C),
(hb1: B, A), (hb2: B, A), (hb3: B, A),
(Uc1: A, C)

The blocked links are removed and this results in graph G2' (A.4):
(pa2: A.2, A.1), (pa3: A.3, A.1), (pa4: A.4, A.5),
(ub1: A.2, B), (ub2: A.3, B), (ub3: A.4, B),
(uc1: A.5, C),
(hb1: B, A), (hb2: B, A), (hb3: B, A),
(Uc1: A, C)

When all the ancestor nodes still contained are removed from this, together with the adjoining connecting lines, graph G3' (A.4) is produced:
(pa2: A.2, A.1), (pa3: A.3, A.1), (pa4: A.4, A.5),
(ub1: A.2, B), (ub2: A.3, B), (ub3: A.4, B),
(uc1: A.5, C).

By means of Dijkstra routing algorithm, the following sequence F1 is determined here as the best route from the transit node A.4 to the representative C of the additional further subnetwork TC:
D' (A.4)=C, uc1, A.5, pa4, A.4=S' (A.4)
By reversing the sequence, the sequence F2 is obtained:
S' (A.4)=A.4, pa4, A.5, uc1, C=D' (A.4)

Since the sequence F2 is never descending in terms of the hierarchy level of the nodes which occur, the operations for forming the sequence F3 do not produce any changes: F3=F2.

The sequence F4 is acquired from the sequence F3, namely:
S' (A.4)=A.4, pa4, A.5, uc1,AB, hc1, C=D' (A.4)

The following information elements DTLs of the routing information ri are derived from the sequence F4:
1. DTL: (A.4, pa4), (A.5, uc1), pointer=2
2. DTL: (AB, hc1), (C, x'00 00 00 00), pointer=1 the last (=2.) DTL of which is not transferred.

The following DTL push-down storage contents are thus transferred from the transit node A.4 to the node A.5:
1. DTL, newly formed: (A.4, pa4), (A.5, uc1), pointer=2
2. DTL, received and further processed: (A, hb1), (B, hb3), (A, Uc1), pointer=3
3. DTL, received and further processed: (AB, hc1), (C, hc2), (AB,x'00 00 00 00), pointer=1

Activity of the transit node C.1 in the additional further subnetwork TC:
The node C.1 receives the following routing information ri:
1. DTL: (AB, hc1), (C, hc2), (AB,x'00 00 00 00), pointer=2.

The node C.1 has stored the network which it can see, as a graph G1 (C.1), see FIG. 3:
(pc3: C.1, C.2), (pc4: C.2, C.3), (pc5: C.3, C.4), (pc6: C.1, C.4)
(uab1: C.1, AB), (uab2: C.4, AB)
(hc1: C, AB), (Hc2: C, AB)

Because the traffic is transit traffic, G1' (C.1) is formed by firstly determining D' (C.1) and Link-to-D' (C.1):
D' (C.1) = AB
Link-to-D' (C1) = hc2.

All the nodes from a hierarchy level which is greater than or equal to the hierarchy level of D' (C.1) = AB, and the relevant adjoining links, are removed from the graph G1 (C.1), but with the exception of D' (C.1) = C itself and excepting those uplinks for which D' (C.1) = AB is an upnode and which are correlated with Link-to-D' (C.1) = hc2.

Graph G1' (C.1) is produced:
(pc3: C.1, C.2), (pc4: C.2, C.3), (pc5: C.3, C.4), (pc6: C.1, C.4),
(uab2; C.4, AB)

Since the node C.1 does not find any blocked connecting lines (these are located in the first subnetwork TA), G1' (C.1)=G2' (C.1).

Because no ancestor nodes relating to node C.1 can additionally be removed from this, it is true that:
G1' (C.1)=G2' (C.1)=G3' (C.1)

Using the Dijkstra routing algorithm, the node C.1 will determine as best route the sequence F1:
D' (C.1)=AB, uab2, C.4, pc6, C.1=S' (C.1)
By reversing the order, sequence F2 is obtained:
S' (C.1), pc6, C.4, uab2, AB=D' (C.1)

Since the sequence F2 is never descending in terms of the hierarchy level of the nodes which occur, the operations to form the sequence F3 do not produce any changes: F3=F2.

The sequence F4 is acquired from the sequence F3, namely:
S' (C.1)=C.1, pc6, C.4, uab2,C,hc2, AB=D' (C.1)

The following information elements DTL of the routing information ri are derived from the sequence F4:
1. DTL: (C.1, pc6), (C.4,uab2), pointer=2
2. DTL: (C, hc2), (AB,x'00 00 00 00) pointer=1 the last (=2.) DTL of which is not transferred.

The following DTL stack is thus transferred from the node C.1 to the further node C.4 in the additional further subnetwork TC:
1. DTL, newly formed: (C.1, pc6), (C.4, uab2), pointer=2
2. DTL, received and further processed: (AB, hc1), (C, hc2), (AB,x'00 00 00 00), pointer=2.

Activity of the re-entry node A.6 for the second re-entry into the first subnetwork TA:
The node A.6 receives the following routing information ri:
1. DTL: (AB, hc1), (C, hc2), (AB,x'00 00 00 00), pointer=3.

If node A.6 detects that the destination terminal is directly connected to it, it transmits to it the connection set-up message along the relevant UNI interface (no longer PNNI interface), in which case, in accordance with the UNI protocol, no information elements DTLs are transmitted at the same time. The route is shut down.

2. Exemplary Embodiment (PNNI Network with Simple and Complex Nodes):

A second exemplary embodiment shows a communications network in which three different network providers A, B and C connect their networks reciprocally with physical lines (connecting lines p): (see FIG. 4)
in New York (NY): A to C, and B to C,
in Chicago (Ch): B to C,
in Atlanta (Atl): A to B,
in Los Angeles (LA): A to B, and B to C.

Blocked lines are crossed out. A subnetwork A terminal in Atlanta wishes to set up a connection to a destination terminal, also in network A, in Las Vegas.

The dotted line shows the physical course of a route, starting at the Atlanta node of the network A and ending in the Las Vegas node, also of the network A. The determination of the routing information, or of this route, is shown below.

According to the PNNI concept, the three subnetworks A, B, C can each be conceived as the logical group node of a hierarchically higher peer group, the sizes of the three networks indicating that they can all be represented as complex nodes: comprising an imaginary nucleus in the center of a large circle, ports at the edge of a large circle, port nucleus connecting lines (spokes between port and nucleus), and port-port connecting lines (bypass exceptions between every two ports). The physical cross-connecting lines between the three networks correspond to so-called horizontal links (h) (see FIG. 10).

Each node of the subnetwork A thus has the following (identical) network structure, in accordance with PNNI, stored as topology information (see FIG. 11). There is a visual representation of its topology database which is in accordance with PNNI. It comprises essentially the "precise" diagram of the subnetwork A as well as the simplified, aggregated nodes which are represented as complex nodes and which represent each of the subnetworks A, B, C as entireties.

Creating a comprehensive topology graph: According to the invention, the following topology graph is derived from the topology database which is in accordance with the PNNI, said topology graph containing only directed, i.e. unidirectional edges. Each node (the simple nodes of the subnetwork A, the port nodes and nucleus nodes of the complex nodes) receives a node number i (1<=i<=m), and each (unidirectional) edge (also referred to as link) receives an edge number j (1<=j<=n).

The topology graph (see FIG. 7) is stored as a table whose elements are indexed by edge number j and which contain the two boundary node numbers of the edge j, i.e. that node at which the directed edge begins and that node to which it leads. The edge direction corresponds to the "outgoing direction" in the sense in which it is used in the horizontal links PTSE.

However, further information is also given. For this reason, the following entries are made per edge j:

| | | |
|---|---|---|
| LinkTable[j] | .FromNode | |
| LinkTable[j] | .ToNode | |
| LinkTable[j] | .ForwardAttributesPtr | |
| LinkTable[j] | .BackwardAttributePtr | |
| LinkTable[j] | .SpokeOrBypass | // TRUE/FALSE |
| LinkTable[j] | .Included | // TRUE/FALSE |
| LinkTable[j] | .InducedLink | // Edge number of the induced |
| | | // uplink edge or induced |
| | | // (outgoing) horizontal edge |
| | | // or 0 |
| LinkTable[j] | .MyUpLink | // Number of the reciprocal |
| | | // edge, if j is downlink, |
| | | // otherwise=0 |
| LinkTable[j] | .AggregationToken | // 4 bytes |
| LinkTable[j] | .Type | // Values are: horizontal, bypass |
| | | // uplink, downlink, spoke, |
| LinkTable[j] | .PortId | // horizontal, uplink |

The topology graph also comprises m nodes. For each node i, the following information is installed:

| | | |
|---|---|---|
| NodeTable[i] | .Type | // Values are: port, nucleus, |
| | | // simple |
| NodeTable[i] | .PortId | // 4 byte port ID>0 if |
| | | // port node |
| NodeTable[i] | .MyNucleusNode | // Associated nucleus node |
| | | // number if Type=Port, |
| | | // otherwise 0) |
| NodeTable[i] | .AncestorNode | // Ancestor node number or 0 |
| | | // if no ancestor node |
| | | // present. Its type is |
| | | // either simple or nucleus. |
| NodeTable[i] | .HierarchyLevel | // Range: 0 to 104 |
| NodeTable[i] | .TransitRestricted | // TRUE/FALSE |
| NodeTable[i] | .NextPortNode | // Chain of port nodes: |
| | | // The nucleus node |
| | | // points to the first |
| | | // port node, the first |
| | | // one to the second, |
| | | // the last to 0. |
| | | // The value is also 0, |
| | | // if i is a simple |
| | | // node. |
| NodeTable[i] | .NodeId | // The same value with |
| | | // port and nucleus |
| | | // nodes. |

The following information can be derived from these entries by conversion:

| | | |
|---|---|---|
| NodeTable[i] | .CountIncomingLinks | // Number of |
| | | // incoming edges |
| NodeTable[i] | .IncomingLinkTable [j] | // Incoming edge |
| | | // j in node i |

A node number i is created:

a) NodeTable[i] .Type = Simple

This assignment is made after the evaluation of a nodal information PTSE of a simple node. It is assigned the NODE ID of this nodal information PTSE by NodeTable[i] .NodeId.

b) NodeTable[i] .Type = Nucleus

This assignment is made after the evaluation of a nodal information PTSE of a complex node. It is assigned the NODE ID of this nodal information PTSE with NodeTable[i] .NodeId.

c) NodeTable[i] .Type = Port

This assignment is made after evaluation of a nodal information PTSE of a complex node and of a relevant (outgoing) horizontal link PTSE or uplink PTSE which contains a port ID. Each port node stores its nucleus node number per NodeTable [i] .MyNucleusNode, and its PORT ID per NodeTable[i] .MyPortID.

The node numbers of the port nodes relating to a complex node are, starting at their nucleus node, interlinked forward per NodeTable[i] .NextPortNode entries.

The switching node (= simple node) which implements this has its own node number stored specially. It is referred to below by S (S as starting node). The node numbers of its ancestor nodes (they are either of the type = simple or nucleus) are determined as follows and interlinked beginning at i=S by means of NodeTable[i] .AncestorNode. Embedded in the nodal information PTSE is a HigherLevelBinding information group which contains the node ID of the next ancestor node. This interlinking is set up by searching and comparing with the NodeTable[i] .NodeID entries.

An edge, i.e. an edge number, is created, in which case: a) LinkTable[j] .Type = Horizontal This assignment is made after evaluating a horizontal link PTSE, whose port is stored in LinkTable[j] .PortId. The opposite edge here is based on the existence of a second complementary horizontal link PTSE. Two horizontal links PTSE are complementary to one another if their originating node and remote node specifications (starting node and destination node) are reciprocal and both contain one and the same aggregation token. Each "horizontal" edge is assigned forward and rearward attributes. The forward attributes are the outgoing resource availability information of the respective horizontal link PTSE. The rearward attributes are the outgoing resource availability information of the complementary horizontal link PTSE.

The "horizontal" edge j starts at a node whose number = NodeTable[i] .FromNode and which is determined as follows:

If the starting node of the horizontal link PTSE is a simple node, the initial node number is determined by this simple node alone. If the starting node is however a complex node, the initial node number is determined by the complex node and additionally by the port ID from the horizontal link PTSE. The initial node is thus a port node.

The horizontal edge ends at a node whose number = LinkTable[j] .ToNode, which is determined as follows:
If the destination node of the horizontal link PTSE is a simple node, the end node number is determined by this simple node (and its NODE ID) alone. However, if the destination node is a complex node, the end node number is determined only by the additional remote port ID. It is thus a port node. A horizontal edge j has, in particular, set LinkTable[j] .InducedLink = 0.

b) LinkTable[j] .Type = Uplink

This assignment is made after evaluation of an uplink PTSE. The forward attributes are the outgoing resource availability information from the uplink PTSE. The rearward attributes are located in an ULIA information group from the uplink PTSE.

The uplink edge starts at a node whose number = LinkTable[j] .FromNode, which is determined as follows: If the starting node of the uplink PTSE is a simple node, the initial node number is determined by the simple node alone. However, if the starting node is a complex node, the initial node number is determined by the complex node plus the port ID from the uplink PTSE. It is then a port node.

The uplink edge ends at a node whose end node number is determined as follows:
If the upnode of the uplink PTSE is a simple node, the end node number is determined by this simple node alone. If the upnode is however a complex node, the end node number is determined by the complex node plus a port ID, which is determined as follows:
Firstly, that ancestor node which has the same hierarchy level as said complex upnode is determined. Then, the topology database is searched at this ancestor node for that horizontal link PTSE whose remote node specification is the NODE ID of the complex upnode and whose aggregation token is identical with that of the uplink PTSE. Under Remote Port ID in this horizontal link PTSE there is the searched-for port ID. The end point of the uplink edge is then a port node. An uplink edge j has set, in particular, LinkTable[j] .InducedLink =j*>0, pointing to an induced further uplink or to an induced horizontal link.

The starting node and end node of the complementary downlink edge are reciprocal with respect to these specifications of the uplink edge. A downlink edge j has, in particular, a reference to the complementary uplink edge j*: LinkTable[j] . MyUplink = j*>0. All the other edges have 0 entered here.

c) LinkTable[j] .Type = DownLink

A complementary downlink edge is additionally created for the uplink edge, with reciprocal boundary nodes and reciprocal forward and rearward attributes.

d) LinkTable[j] .Type = Spoke

This assignment is made after evaluation of a nodal information PTSE of a complex node plus an associated nodal state parameter PTSE with input port x=0 and output port y=0 (default spokes). With regard to a complex node, two complementary edges are created between a port node and a nucleus node.

The forward attributes are identical to the rearward attributes. This is true for the port-nucleus connecting lines and for the nucleus-port connecting lines. After all the spoke edges have been created in this way, it will be possible to correct the forward and rearward attributes of individual (default) spokes on the basis of further nodal state parameter PTSEs with x=0 and y>0 or x>0 and y=0. If, owing to a nodal state parameter PTSE with input port x>0 and output port y=0, the forward attributes of a port-nucleus connecting line are modified, the rearward attributes of the complementary nucleus-port connecting line are also modified with the same values.

d) LinkTable[j] .Type = Bypass

This assignment is made after evaluation of a nodal information PTSE of a complex node plus an associated nodal state parameter PTSE with input port x>0 and output port y>0 (bypass exception). There is provision for a nodal state parameter PTSE also to be prescribed for the reverse direction from the input port y to the output port x. Each of these two PTSEs contains the forward attributes which can serve simultaneously as rearward attributes of the complementary edge. A pair of bypass exceptions is provided between two ports whenever the two ports lie geographically as near to one another as possible.

All the edges receive, in addition to the fact that an edge number j is created for them, the marking LinkTable[j] .Included := TRUE If these entries have been made, the topology information is available in the graph G1.

Reduction of the topology graph G1:

The topology graph which has been created so far is the most comprehensive graph and is then newly created if PTSEs which are decisive for its creation have disappeared from the topology database or new ones have been added.

Before a specific determination of a route which includes very different particular features and communications conditions, certain edges j are excluded from this, specifically per: LinkTable[j] .Included :=FALSE a) Avoiding transit-restricted nodes:

According to a transit-restricted bit of its nodal information PTSE, a node may not be available for transit switching services. The result of this is that for relevant simple, port or nucleus nodes i, NodeTable[i] .TransitRestricted:=TRUE is set. An edge j is excluded if at least one of its two boundary nodes has set this value to TRUE and it is at the same time neither a source switching node nor destination switching node of the route. The destination switching node D is always of the simple or nucleus type, never port. If the destination node D is of the nucleus type and this, like all the associated port nodes, has set TransitRestricted:=TRUE, neither the nucleus node nor the associated port nodes are excluded from the topology graph. In the example: node 22 and all the adjoining edges b) Non-metric peripheral conditions not fulfilled Individual edges could be provided only for a subset of service categories (CBR, ABR, UBR, VBR-rt, VBR-nrt), which does not belong to that of the connection request currently in question. The communications conditions provided are non-metrical quality-of-service parameters (max. error rate) whose individual edges cannot satisfy the requirements of the connection request. They are excluded from graph G1.

c) Generic Call Admission Control (G-CAC);

At the given time, individual edges might not have the necessary bandwidth available, and therefore not pass the Generic Call Admission Control test.

LinkTable[i] .ForwardAttributePtr and LinkTable[i] .BackwardAttributePtr comprise the current usage factor information of the individual edges which is required here. The edges which do not fulfill the communications conditions are excluded from graph G1. In the example, the unidirectional edge 56:21-19 is excluded on this occasion. The topology graph which is reduced owing to a), b) or c) is designated as graph G2.

d) Ancestor node

All the ancestor node of the source node S of the route are excluded, i.e. all the edges which start or end at them. All these ancestor nodes are in the sequence {NodeTable[i] .AncestorNode} starting with i=s. In the example, nucleus and port nodes of subnetwork A, and all adjoining edges, are excluded. The graph which is reduced in this way is referred to as G3.

e) Possible limitation on the degree of bypasses:

The node determined as destination switching node D of the route is one whose PNNI hierarchy level is equal to h [0<h<=104). A network administrator could possibly prescribe an integer x such that only bypasses which do not exit the hierarchy range of an ancestor peer group of the level H=Max(0, h-x) are permitted. All those edges of which at least one boundary node has an excessively high hierarchy range, i.e. a value <H, are excluded. In the example, no edges are excluded on this occasion. The graph which is restricted in this way is designated G4.

Dijkstra best route calculation

Based on the reduced topology graph G3 or G4, a Dijkstra best route calculation is carried out, starting from precisely one starting node S=MyOwnNodeNumber (S=21) to any destination node. This iteration stops as soon as the best route has been found for the desired destination node D (D=17).

The minimization criterion, referred to below as distance, is, for example, the minimum administrative weight sum. An iteration of the Dijkstra algorithm includes two substeps:

a) Update of the distance to the source switching node at all the nodes at which this distance value is not yet definitive.

b) Determination of the next node for which the distance entered at a given time is the definitive one, in which case it would also be defined which node is the direct preceding node for this node and which edge is the preceding edge in the direction of the source switching node.

It is also to be noted that only those edges which end in the respective node are considered.

Metric peripheral conditions: Both a Cell Transfer Delay and a Cell Delay Variation are valid as metric parameters. If appropriate, total values (as in the case of distance) are also formed for this and compared with a prescribed upper limit. If it is detected during substep b) that one of the metric peripheral conditions is no longer fulfilled and the distance to the source node is not yet definitive for the destination node, the iteration is aborted without success.

The Dijkstra routing algorithm determines in the example (see FIG. 8) the following edge sequence, drawn heavily in black, starting at the node 21 and ending at the node 17:

That is to say the Dijkstra routing algorithm determines the sequence F1

{Link#: from-node#—to-node#}:

57:21-5, 8:5-1, 3:1-3, 15:3-9; 26:9-7; 23:7-8; 14:8-2; 11:2-6; 42:6-16; 47:16-17;

The spokes and bypass exceptions are removed from this sequence F1, i.e. all those edges j for which the following applies:

LinkTable[j] .Type = "Spoke" or "Bypass", also:

57:21-5, 15:3-9; 14:8-2; 42:6-16; 47:16-17;

From this {Link#: from-node#—to-node#}—sequence F1, a {Node#,Link#,Node#} sequence F2 is produced by formal re-ordering by exchanging from-node# and Link#, and the to-node# values are removed, with the exception of the very last one. In this way, the sequence F2, comprising n=5 edges and n+1=6 nodes, is obtained.

The method steps for forming the routing information, i.e. for acquiring a DTL stack, correspond to those of the first exemplary embodiment. These are repeated below, but adjusted to the designations used here and to the preliminary operations:

That sequence F3 whose nodes are never descending in terms of their hierarchy levels are determined:

```
bhrl := FALSE;                // bhrl is an abbreviation for:
                              // Below Highest Reached Level
current_node := node-1;       // i.e.: = Source Node S = 21
current_node_level := level of the current_node;
                              // i.e.:= NodeTable [S].Hier-
                              // archyLevel
``` for i:=1 step 1 to n-1 do
    if level of the node-i+1 is lower (in other words numerically larger) than current_node_level then
        if bhrl = FALSE then
        determine that ancestor node of node-i+1 whose level is equal to the current_node_level. To do this, the values
    NodeTable[k] .AncestorNode
        are navigated through starting with k=node-i+1 until a node a is arrived at with
    NodeTable[a] .HierarchyLevel=current-node_level.
        Link-i, which is a DownLink, is replaced by the associated Logical Group Node horizontal link (with the same aggregation token). The reciprocal uplink j is equal to LinkTable [link-i] .MyUplink.
        The sequence {LinkTable [j] .InducedLink} is navigated through until a j* is arrived at with LinkTable [j*] .InducedLink =0.
        j* is the searched-for horizontal edge. Replace node i+1 by the ancestor node a which has been determined.
        bhr1:= TRUE;
    else
        remove link-i and node-i+1 from the sequence.
    end
    else
    if bhr1= TRUE then
        Replace link-i by that assigned (induced) Uplink or else Logical Group Node horizontal link j* which starts from the level given by the current_node_level and leads to the node-i+1.
        That is to say the sequence (LinkTable [j] .InducedLink} is navigated through, starting at j=link-i until a j* is arrived at with LinkTable[j*] .FromNode = i* such that NodeTable-[i*] .HierarchyLevel = current-node_level.
Node-i+1 is retained unchanged in the sequence. bhr1 := FALSE;
else
Retain link-i and node-i+1 unchanged in the sequence.
end
current_node_level : = Level of the node-i+1;
end
Next i;
In the example, the sequence F3 comprising n=4 edges and n+1=5 nodes is obtained:
Node21, Link57, Node3, Link15, Node8, Link14, Node6, Link21, Node12
A sequence F4 is formed from the sequence F3 as follows:
for i:=1 step 1 to n–1 do
if link-i = Uplink then
add after link-i that ancestor node of source node S which is of the same level as node-i+1. In turn, add after it that horizontal link H which is assigned to the link-i by virtue of the identical aggregation token. (The RelationTbl is run through by LinkTable [j] .Induced Link starting at $j_1$=link-i as far as H with LinkTable [j] .InducedLink=0 and H=$j_s$ is found).
end
next i;
The sequence F4 is as follows:
Node21, Link57, Node12, Link20, Node3, Link15, Node8, Link14, Node6, Link21, Node12
A sequence of DTLs is formed from F4 in that the sequence F3 is broken up after each uplink. The node numbers are replaced by the relevant node IDs and the edge numbers by the relevant port IDs. The uplink detection is effected by virtue of LinkTable[j] Induced Link unequal to 0:.
1. DTL:
(NodeTable[21] NodeId, LinkTable[57] .PortId),
// Node in Atlanta of network A, Uplink $U_{AB2}$
2. DTL:
(NodeTable[12] .NodeId, LinkTable[20] .PortId,
// Network A, $h_{AB2}$
NodeTable[3] .NodeId, LinkTable[15] .PortId,
// Network B, $h_{BC2}$
NodeTable[8] .NodeId, LinkTable[14] .PortId,
// Network C, $h_{BC1}$
NodeTable[6] .NodeId, LinkTable[21] .PortId,
// Network B, $h_{AB1}$
NodeTable[12] .NodeId, 0) // Network A
The routing information which is obtained then has to be converted into DTL information elements (IE) in compliance with the PNNI v1.0 signalling protocol.
Refilling of DTL stack by the Entry Border switching node:
If a connection set-up message arrives at an entry border switching node S' in a new peer group, the received DTL stack is filled again, i.e. a route section is determined and is described by means of routing information (DTL). This route section corresponds to that hierarchically higher link (this can be either a horizontal link or an uplink) which is referenced by the current transit pointer of the uppermost DTL in the stack. It will be referred to below as Link-to-D'.
The starting point of the route section is S' itself. The end point of the route section is the node D', which is determined as follows.
The entry which follows the current transit pointer of the uppermost DTL in the stack contains the node ID of D'.

However, if there is no subsequent entry in it, this is found in the next lowest DTL in the stack, subsequent to the respective current transit pointer etc.
If such a subsequent entry is not contained even in the lowest DTL in the stack, D' is defined by means of a search term which is removed from the Called Party Number information element.
S' searches through its topology database starting at the hierarchically lowest node in order to find that destination node D' which can be reached with reference to the search term. If the target address is a so-called ANYCAST address which generally adapts a plurality of pieces of equipment/servers to different nodes, an advertisement scope of a reachability information PTSE is also checked during the determination of D'.
j* will be assumed to be the edge number of the Link-to-D', and i* will be the node number of D'. Determination of J* and i*:
All the edges j will be searched through, and j* will be determined for the one for which the following correspondence applies:
NodeTable [LinkTable [j] .FromNode].NodeId = Node ID, referenced by CTP AND LinkTable [J] .PortId = Port ID uppermost in the stack, referenced by CTP uppermost in the stack.
The node number i* of the destination node D' is thus LinkTable [j*] .ToNode.
Reduction of the topology graph:
As soon as the node S' has determined the node D', it excludes certain nodes and edges from the topology graph known to it (as described above). If a further rerouting attempt is made after the message indicating nonfulfilment of the communications condition (crankback), it also removes all those nodes together with contact edges which had previously proven to be blocking.
However, the following also applies:
The nodes together with contact edges of hierarchy level greater than/equal to that of the node D' are removed, excepting D' itself and excepting all uplinks which end in D' and which have the same aggregation token as Link-to-D'. That is to say excepting the node i* and all the edges j for which the following applies:
LinkTable [j] .ToNode = i* AND LinkTable [j] .AggregationToken = LinkTable [j*].AggregationToken
Based on the topology graph which has been produced in this way, a best route from S' to D' (in other words from the node number which represents the simple node S' to i*) is determined, and DTL information elements are derived from it, as described above. The DTL stack is filled up again in the SET-UP message with the DTLs acquired in this way, with the exception of the very last DTL to be acquired (whose content is already contained in the DTL received at the top of the stack).
3. Exemplary Embodiment (Grouping of Narrowband Networks)
A third exemplary embodiment (see FIGS. 9 to 14) relates to a consortium of a plurality of narrowband network providers A, B, C which have connected their networks to form one communications network (see FIG. 9). Each individual subnetwork is, viewed independently, a peer group which is lowest in the hierarchy. Above it there is precisely one common, hierarchically higher peer group in which each subnetwork is represented as a logical node.
The significance of this concept is that the switching node of a specific subnetwork only has to have precise knowledge of its own network topology. With regard to the other subnetworks, they only know the "rough" network topology of the communications network, in other words the way in which they are reciprocally interconnected.

Accessibility: each switching node of a specific subnetwork knows which terminals (call numbers) are connected to each of the nodes of its own subnetwork. In addition, it knows which terminals (call numbers) are connected to each external subnetwork—by means of summarized entries.

Three different network operators A, B and C connect their subnetworks reciprocally with physical lines (p):
in Dresden (DD): A to C, and B to C,
in Hamburg (HH): B to C,
in Munich (M): A to B,
in Cologne (K): A to B and B to C.

The dotted line in FIG. 9 designates the physical course of a route which is to be determined, starting in the source switching node (Munich) of the subnetwork A and ending in the destination switching node (Stuttgart), also of the network A.

In analogy to the PNNI concept, each of the subnetworks A, B, C can be represented as a complex logical node, i.e. comprising an imaginary nucleus in the center of a large circle, ports at the edge of a large circle, port-nucleus connecting lines (spokes), port-port connecting lines (bypass exceptions) (see FIG. 5).

In the source switching node or the device performing the formation of the routing information, the following graph G1, a so-called high-level graph (HL) is stored (see FIG. 6):
Edge HL-1 : Node HL-1 -Node HL-2
Edge HL-2 : Node HL-1 -Node HL-3
Edge HL-3 : Node HL-1 -Node HL-4
Edge HL-4 : Node HL-1 -Node HL-5
Edge HL-5 : Node HL-1 -Node HL-6
Edge HL-6 : Node HL-1 -Node HL-5
Edge HL-7 : Node HL-2 -Node HL-6
Edge HL-8 : Node HL-2 -Node HL-11
Edge HL-9 : Node HL-3 -Node HL-10
Edge HL-10 : Node HL-4 -Node HL-9
Edge HL-11 : Node HL-5 -Node HL-14
Edge HL-12 : Node HL-6 -Node HL-15
Edge HL-13 : Node HL-7 -Node HL-11
Edge HL-14 : Node HL-7 -Node HL-10
Edge HL-15 : Node HL-7 -Node HL-9
Edge HL-16 : Node HL-7 -Node HL-8
Edge HL-17 : Node HL-8 -Node HL-9
Edge HL-18 : Node HL-8 -Node HL-13
Edge HL-19 : Node HL-12 -Node HL-13
Edge HL-20 : Node HL-12 -Node HL-14
Edge HL-21 : Node HL-12 -Node HL-15
the connecting lines (links, edges) are designated from small node number to relatively large node number.

This graph G1 is to be entered in the same way into the switching nodes of the subnetworks involved. Each nucleus node, each port node and each edge thus receives a unique number. This number makes it possible for each switching node to understand the same thing from the relevant node number or edge number.

Each switching node receives a marker relating to nucleus or port, each edge receives a marker in the form "spoke", "bypass exception" or else "horizontal". In addition, each switching node receives its geographical coordinates. Each nucleus node receives, in a suitable summarized form, specifications indicating which terminals are internal subscribers of this subnetwork. Each switching node and each edge receives a high-level marker HL.

Parallel to this, each switching node of a quite specific subnetwork receives a topology graph G2 (low-level graph LL) of this specific subnetwork, for example each switching node of the subnetwork A receives the following topology graph (see FIG. 12):

Edge LL-1 : Node LL-1 -Node LL-2
Edge LL-2 : Node LL-1 -Node LL-4
Edge LL-3 : Node LL-1 -Node LL-5
Edge LL-4 : Node LL-2 -Node LL-3
Edge LL-5 : Node LL-3 -Node LL-4
Edge LL-6 : Node LL-4 -Node LL-5
Edge LL-7 : Node LL-4 -Node LL-6
Edge LL-8 : Node LL-6 -Node LL-7
Edge LL-9 : Node LL-6 -Node LL-8
Edge LL-10 : Node LL-7 -Node LL-8
Edge LL-11 : Node LL-7 -Node LL-9
Edge LL-12 : Node LL-8 -Node LL-9
The edges are designated from small node number to relatively large node number. Each switching node and each edge is marked with "low-level"=LL.

The source switching node combines the high-level graph and the low-level graph by deleting its own high-level port nodes, its own high-level nucleus node in the graph, and its own spoke and bypass exception edges. In contrast, the horizontal edges which lead away from these port nodes of said node are modified in such a way that they now lead away from the switching nodes in accordance with the low-level graph. They continue to be marked as HL.

Each port of a specific subnetwork has topology information as to which HL nodes represent its own subnetwork. Each port also knows, with regard to the HL port nodes of its own subnetwork, the respectively assigned LL nodes.

The graph G3 which is combined in this way is as follows:
Edge HL-1 : Node HL-1 -Node HL-2
Edge HL-2 : Node HL-1 -Node HL-3
Edge HL-3 : Node HL-1 -Node HL-4
Edge HL-4 : Node HL-1 -Node HL-5
Edge HL-5 : Node HL-1 -Node HL-6
Edge HL-6 : Node HL-1 -Node HL-5
Edge HL-7 : Node HL-2 -Node HL-6
Edge HL-8 : Node HL-2 -Node HL-11
Edge HL-9 : Node HL-3 -Node HL-10
Edge HL-10 : Node HL-4 -Node HL-9
Edge HL-11 : Node HL-5 -Node LL-6
Edge HL-12 : Node HL-6 -Node LL-1
Edge HL-13 : Node HL-7 -Node HL-11
Edge HL-14 : Node HL-7 -Node HL-10
Edge HL-15 : Node HL-7 -Node HL-9
Edge HL-16 : Node HL-7 -Node HL-8
Edge HL-17 : Node HL-8 -Node HL-9
Edge HL-18 : Node HL-8 -Node LL-9
Edge LL-1 : Node LL-1 -Node LL-2
Edge LL-2 : Node LL-1 -Node LL-4
Edge LL-3 : Node LL-1 -Node LL-5
Edge LL-4 : Node LL-2 -Node LL-3
Edge LL-5 : Node LL-3 -Node LL-4
Edge LL-6 : Node LL-4 -Node LL-5
Edge LL-7 : Node LL-4 -Node LL-6
Edge LL-8 : Node LL-6 -Node LL-7
Edge LL-9 : Node LL-6 -Node LL-8
Edge LL-10 : Node LL-7 -Node LL-8
Edge LL-11 : Node LL-7 -Node LL-9
Edge LL-12 : Node LL-8 -Node LL-9

Based on this topology graph G3, the respective source switching node of the subnetwork A activates a Dijkstra best route calculation and receives a node-edge-node sequence, starting in the example at the source switching node (Munich) and ending at the prescribed destination switching node (Stuttgart).

Munich=Kn.LL-9, Ka.HL-11, Kn.HL-5, Ka.HL-4, Kn.HL-1, Ka.HL-3, Kn.HL-3, Ka.HL-9, Kn.HL-10, Ka.HL-14, Kn-HL-7, Ka.HL-13, Kn.HL-11, Ka.HL-8, Kn.HL-2, Ka.HL-7, Kn.HL-6, Ka.HL-5, Kn.LL-1, Ka.LL-1, Kn.LL-2=Stuttgart. (see FIG. 13)

The node-edge-node sequence which is determined in also entered into a connection set-up message by means of a single information element. Before this connection set-up message has been sent for the first time, this information element is evaluated and processed. In this process, the first node (=source switching node) is deleted. The first edge is evaluated in order to determine the correct trunk line to the next switching node. In response, this edge is also deleted in the information element. The "old", i.e. already evaluated, information is thus cut away.

If the connection set-up message arrives at a switching node, the uppermost node of the information element being a HL node (HP port node), the receiving switching node must calculate a route section (in which exclusively LL nodes occur) by means of the subnetwork which has been reached at that time, receive the corresponding node-edge sequence into the routing information element and correspondingly carry on with the connection set-up.

Case A

The uppermost node is a LL node number (that of the receiving switching node). If no edge number has been received, the destination switching node is reached. Otherwise, the connection set-up request is sent on via the edge which has arrived at the top. However, the uppermost node number and uppermost edge number are cutaway beforehand.

Case B

The uppermost node is a HL node number (specifically a HL port node number). This can be transferred to the LL node number of the receiving switching node. It is tested whether the subnetwork which has been reached at that time is to be exited again—either immediately or after passing through its own subnetwork. The subnetwork is exited again if, on searching through the received routing information element (from top to bottom), either a LL node is arrived at or a HL (port) node of an external network is arrived at. In such a case, the subnetwork is exited immediately if either a subnetwork-external HL node or an LL node (which belongs to an external subnetwork) is present as the second node number from the top.

Case B.1

The network cannot be exited again. The entire contents of the received routing information element are removed. The LL destination node is determined on the basis of a terminal called by means of a received "Called Party Number" information element. The best route to it is calculated and the node-edge-node sequence which has been determined is inserted into the routing information element—with the exception of the very first node and the very first edge.

Case B.2.1

The subnetwork is to be exited again immediately. The connection set-up request is passed on via the edge found at the top, but the uppermost node, and likewise this uppermost edge, is cut away beforehand.

Case B.2.2

The subnetwork is to be exited again after passing through. On searching through from top to bottom, the last HL node which belongs to its own network (HL exit port node) is found in the routing information element. This is transferred to the relevant LL node (LL exit node), and a best route to this switching node is calculated. The uppermost entries including those of the HL exit port node are deleted from the received routing information element. A best route is calculated starting at the instantaneous switching node and ending at the LL exit node, and the relevant node-edge-node sequence is inserted at the top into the routing information element (during which of course the starting node and the starting edge are omitted), and the connection set-up message is passed on via the omitted starting edge.

In this method for forming routing information, a subnetwork (here subnetwork A) is exited in the direction of the set-up and entered later again starting at another port.

If, in addition to the described routing information element, an information element (crankback; similar to that in PNNIv1.0) for interrupting the display is inserted, said element being carried along in a RELEASE message of the interruption in order to report a blocking node, targeted rerouting can be initiated, during which it is guaranteed that the blocking node is not searched for again. The blocking LL is reported. The RELEASE message is sent back as far as the source switching node or else to the entry node in the subnetwork of the blocking node. Here, the Dijkstra algorithm is carried out again, based on a topology graph in which the blocking node together with contact edges have been removed.

This is possibly repeated many times, i.e. at each further blockage there is a report back to the node by RELEASE message, but then at the next determination of a route the basis used is a topology graph in which all the previously reported blocking nodes together with contact edges are removed.

If all (a limited number) of these rerouting attempts fail, it is possible to go back to the preceding network by RELEASE message, the crankback information element containing a HL (nucleus) node. In the preceding network, the RELEASE message should be sent back to the entry node. Only there should the Dijkstra algorithm be carried out again, the reported blocking HL nucleus node, together with all the associated HL port nodes, being previously removed in the topology graph in order to ensure that the blocking network is entirely avoided at the next attempt.

During the determination of the route, the geographical coordinates of the (LL and HL) nodes, which are known, are resorted to. The route which is found by means of the Dijkstra algorithm is a route with the shortest geographical distances. The geographical distances can be represented on tariff zones, with the result that there is a cost reduction for the connection set-up when the distance is short. When determining routes it is irrelevant whether the destination subscriber is connected to the communications network itself or is to be linked to an interface to an adjacent subnetwork outside the communications network.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for forming routing information for a connection set-up, satisfying adjustable communications conditions, from a source switching node to a destination switching node, in a communications network having at least two subnetworks with switching nodes and connecting lines which connect the at least two subnetworks, subnetworks being connected to one another via connecting lines and topology information on the subnetwork to which the source switching node belongs, and at least on an interconnection of the subnetworks being stored so as to be available for said source switching node, comprising the steps of:

selecting a subset of the switching nodes and connecting lines which satisfies the communications conditions and whose topology information is stored in the source switching node;

determining a route using elements of this set, which, in a direction from the source switching node to the destination switching node, leaves at least one subnetwork once and returns to said at least one subnetwork, and forming routing information from the route which has been determined.

2. The method as claimed in claim 1, wherein based on hierarchically organized switching nodes which are represented by logical nodes of different orders, the route is determined with exclusion of parts of the hierarchy.

3. The method as claimed in claim 1, wherein a subnetwork which contains the destination switching node is determined in the source switching node from the topology information.

4. The method as claimed in claim 1, wherein a route and a description of a route is determined in accordance with principles of a Private Network Node Protocol.

5. The method as claimed in claim 4, wherein based on topology information, at least one subnetwork is represented by a complex switching node.

6. The method as claimed in claim 5, wherein a complex switching node is defined by at least one port node, a nucleus node, port-nucleus connecting lines and port-port connecting lines.

7. The method as claimed in claim 6, wherein connecting lines relating to port-nucleus links and port-port links are removed during formation of the routing information.

8. The method as claimed in claim 1, wherein connecting lines between two switching nodes in both traffic directions are handled independently.

9. The method as claimed in claim 1, wherein the route is determined according to a Dijkstra algorithm.

10. The method as claimed in claim 1, wherein when the communications conditions for a route which has already been determined are not fulfilled, at least one of a respective switching node and respective connecting line are signalled to the source switching node.

* * * * *